United States Patent [19]
Roth

[11] Patent Number: 5,544,287
[45] Date of Patent: Aug. 6, 1996

[54] ON-LINE BARCODE PRINTER SYSTEM WITH MULTI-LEVEL USER PRINTER COMMANDS

[75] Inventor: Mark W. Roth, Miamisburg, Ohio

[73] Assignee: Monarch Marking Systems, Inc., Dayton, Ohio

[21] Appl. No.: 71,676

[22] Filed: Jun. 3, 1993

[51] Int. Cl.6 ............................ G06K 19/06; G06K 19/00
[52] U.S. Cl. ............................................ 395/114; 395/101
[58] Field of Search ............................................ 395/115, 102, 395/114, 111, 112, 101

[56] References Cited

U.S. PATENT DOCUMENTS

| 4,829,568 | 5/1989 | Clark et al. | 380/23 |
| 4,949,381 | 8/1990 | Pastor | 380/51 |
| 5,239,169 | 8/1993 | Thomas | 235/462 |
| 5,287,434 | 2/1994 | Bain et al. | 395/115 |
| 5,294,202 | 3/1994 | Sawada et al. | 395/102 |

FOREIGN PATENT DOCUMENTS

| 0352091A2 | 1/1990 | European Pat. Off. | |
| 0364934A2 | 4/1990 | European Pat. Off. | |
| 0554612 | 8/1993 | European Pat. Off. | G06K 19/06 |
| 0578924 | 1/1994 | European Pat. Off. | G06K 17/00 |
| WO89/10601 | 11/1989 | WIPO | |

Primary Examiner—Raymond J. Bayerl
Assistant Examiner—Steven P. Sax
Attorney, Agent, or Firm—McAndrews, Held & Malloy, Ltd.

[57] ABSTRACT

A barcode printer system is shown having a host processing system in communication with a barcode printer. The host processing system converts multi-level user input printer commands into a data stream in the printer control language of the barcode printer for transmission to the printer. The host processing system stores a number of printer command function routines, each of which is associated with a number of multi-level user input printer commands. Each user input printer command includes format and data information in a single command. A low level user input printer command, however, may include only a user readable word and data, the host processing system automatically utilizing stored default values for the format information when converting the command. A higher level user input printer command may include an abbreviation designating the command and values for one or more format variables as well as data. The multi-level user commands are not fixed in length so as to be user friendly for low level users but flexible for higher level users.

16 Claims, 23 Drawing Sheets

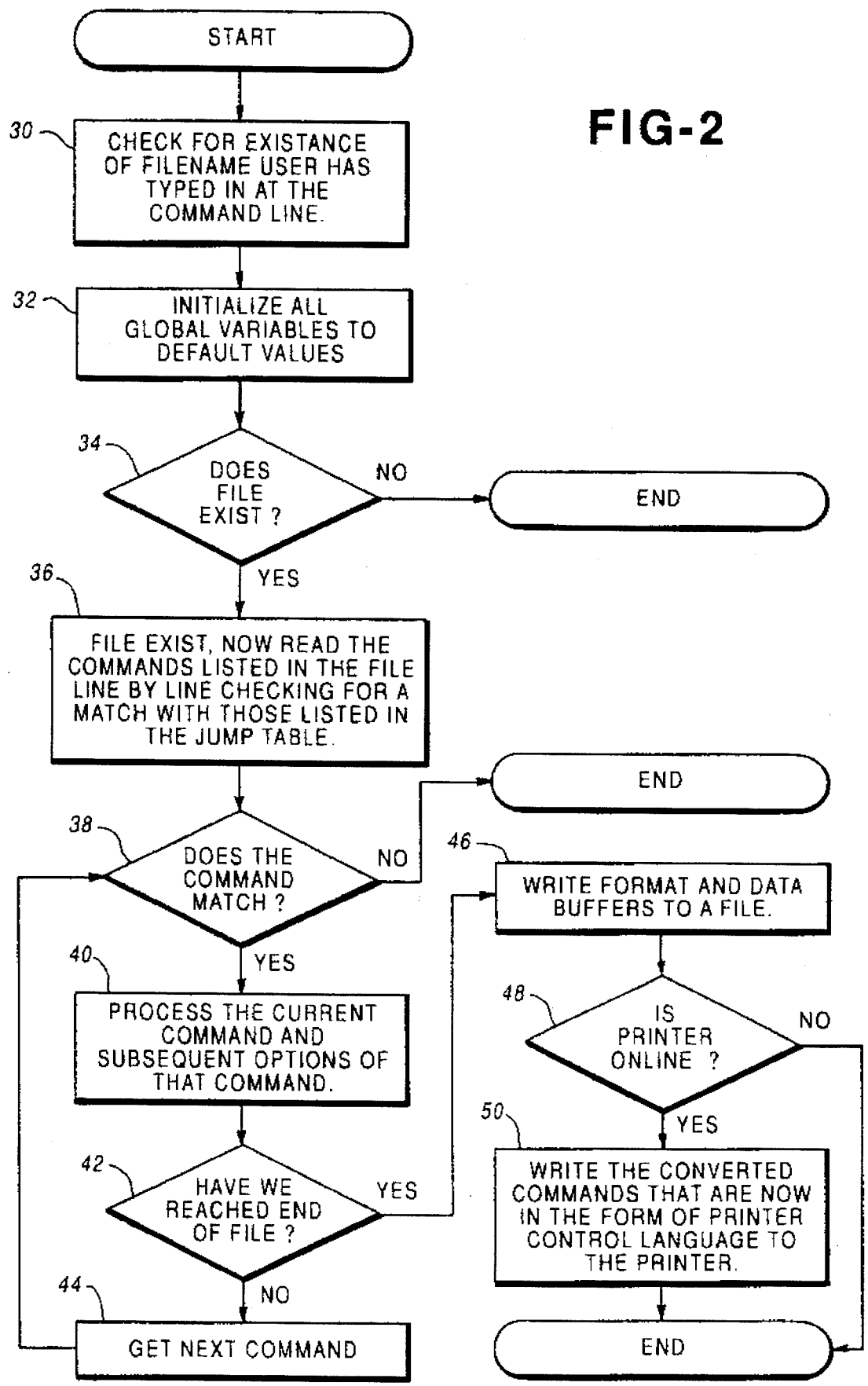

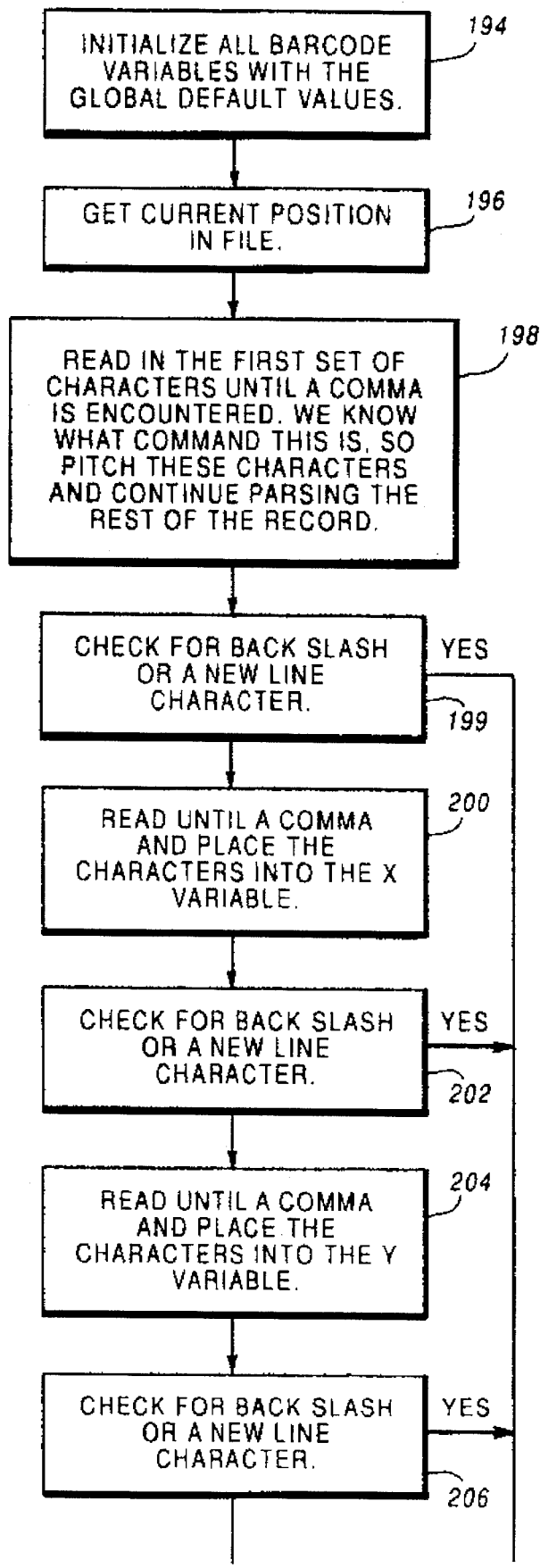
FIG-6A1

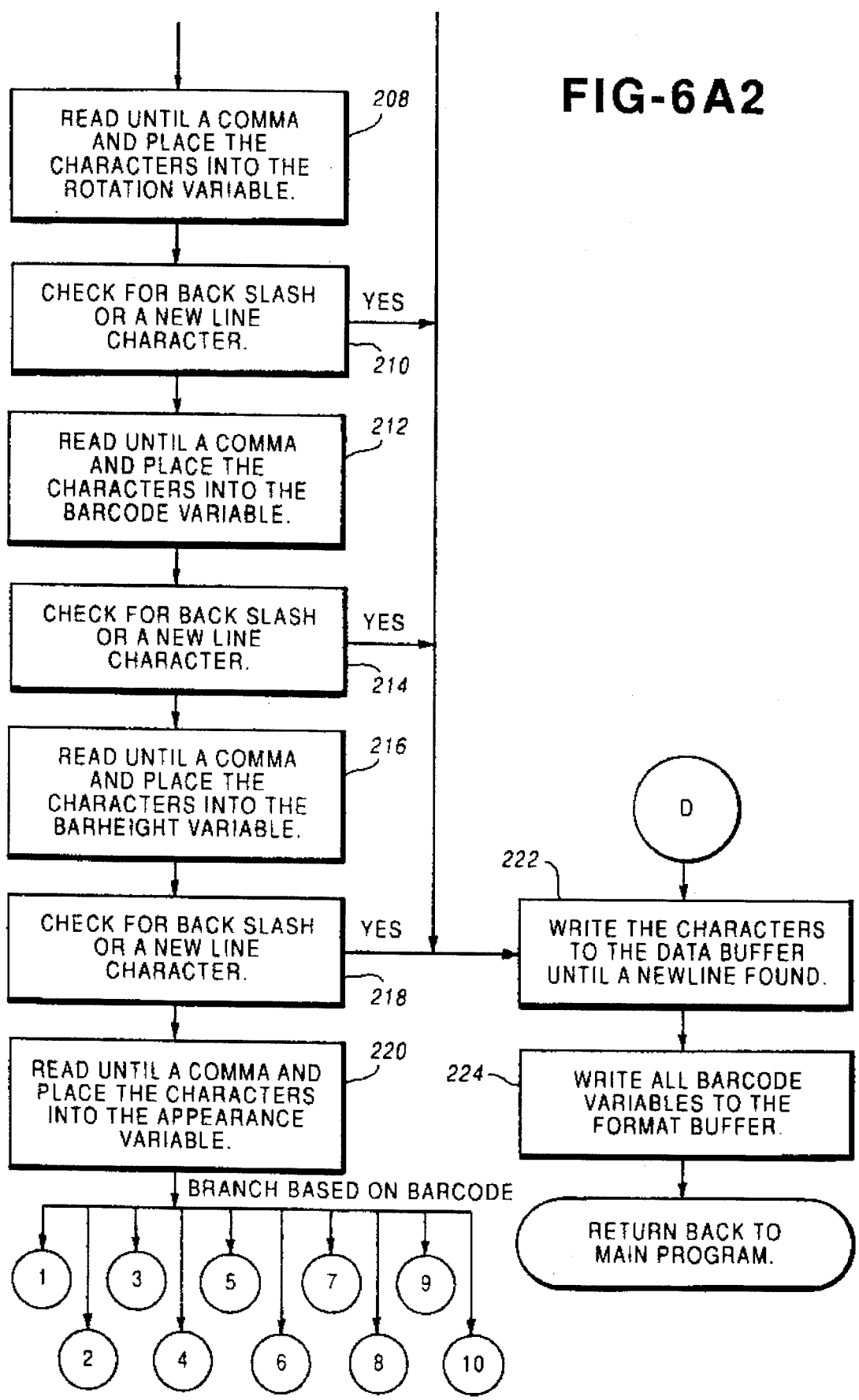
FIG-6A2

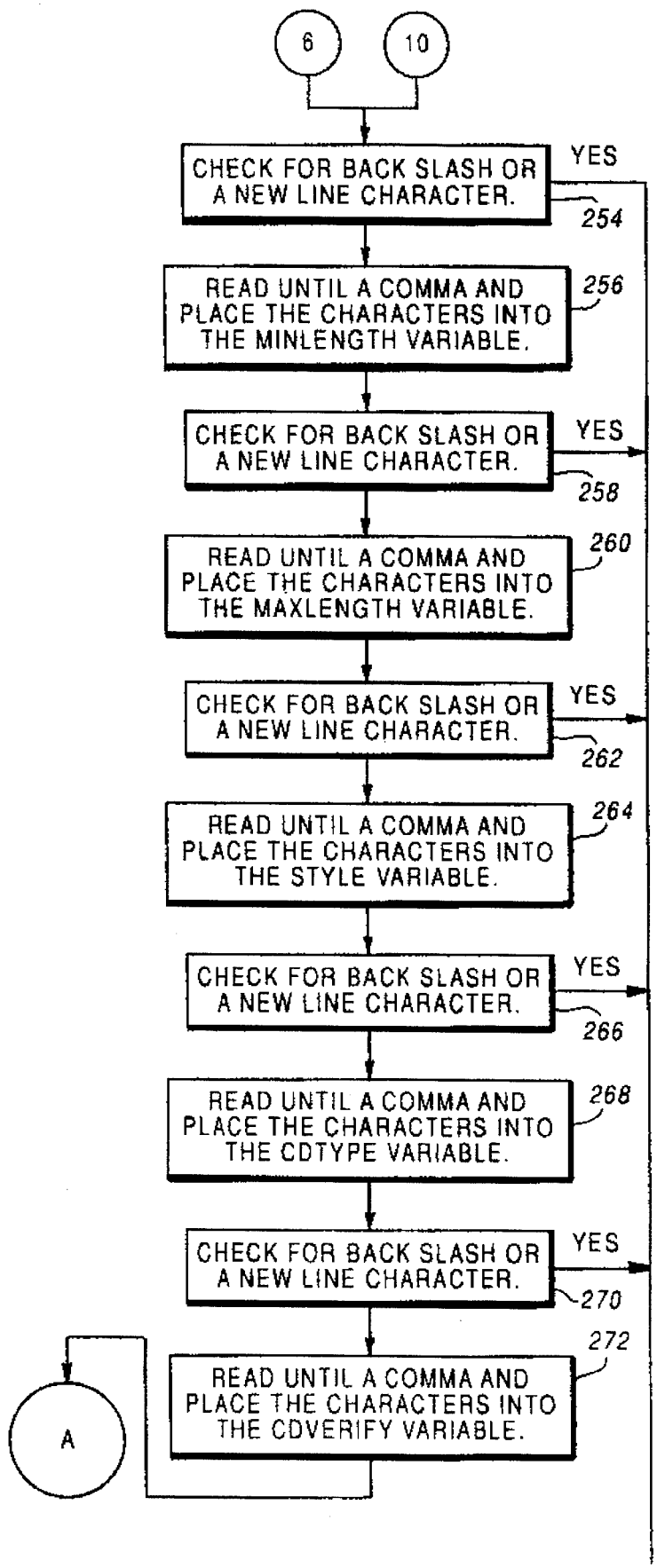
FIG-6D1

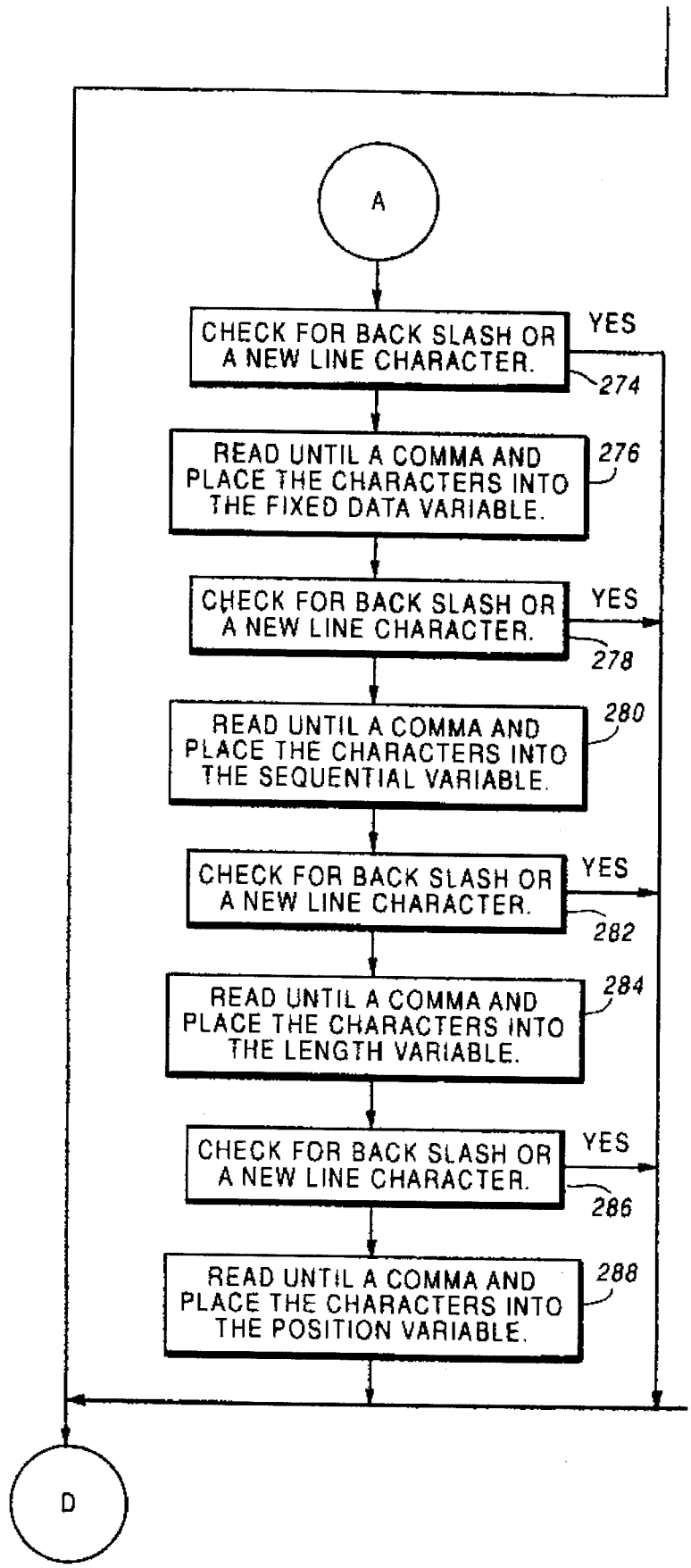

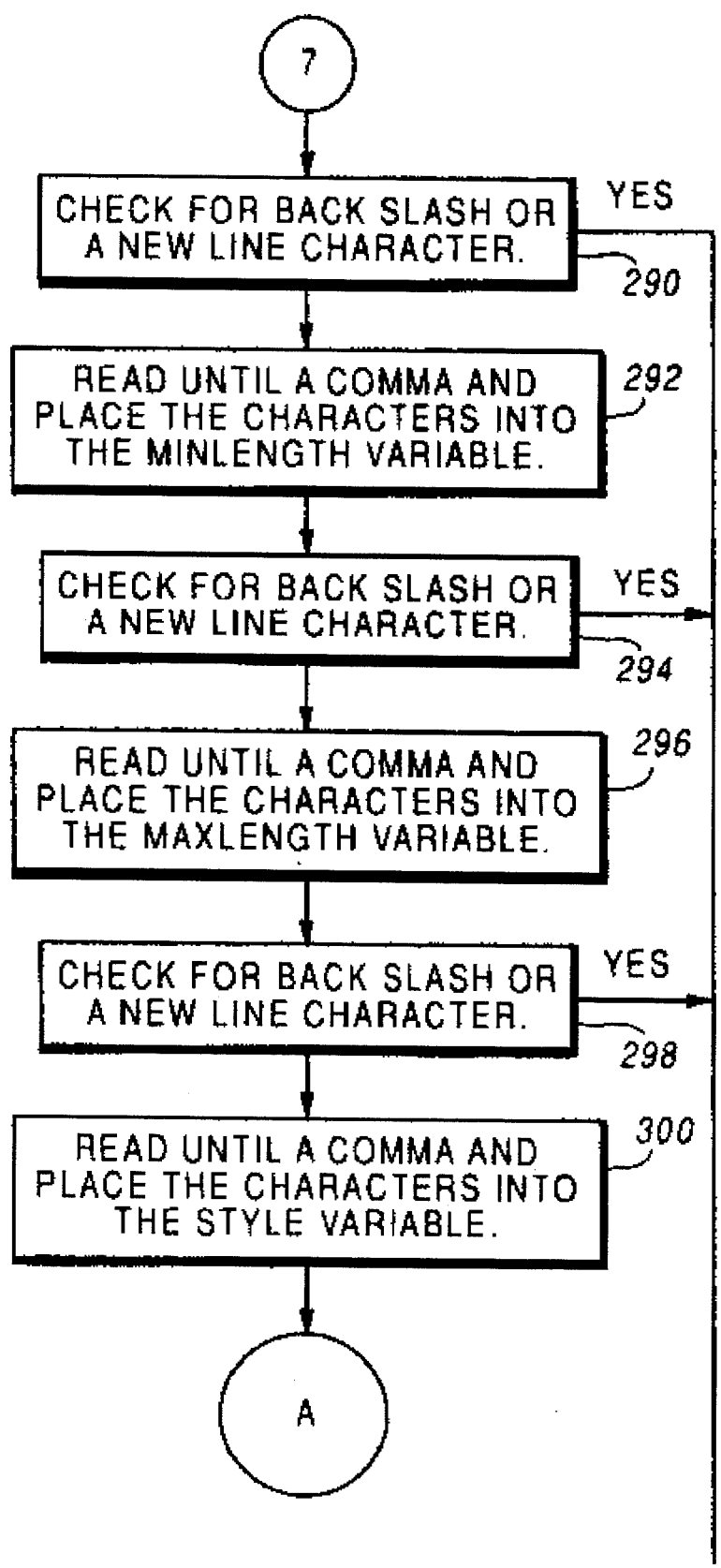
FIG-6E1

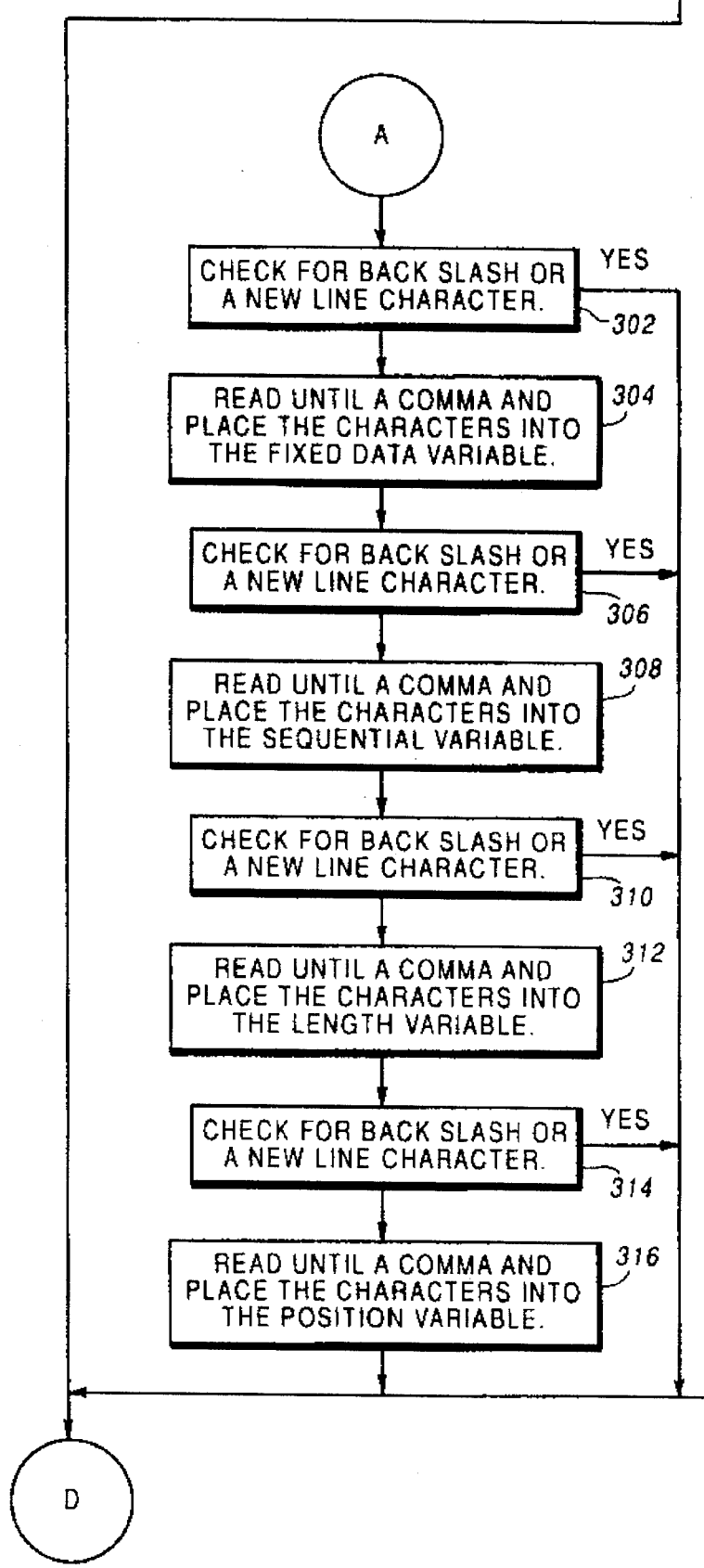
FIG-6E2

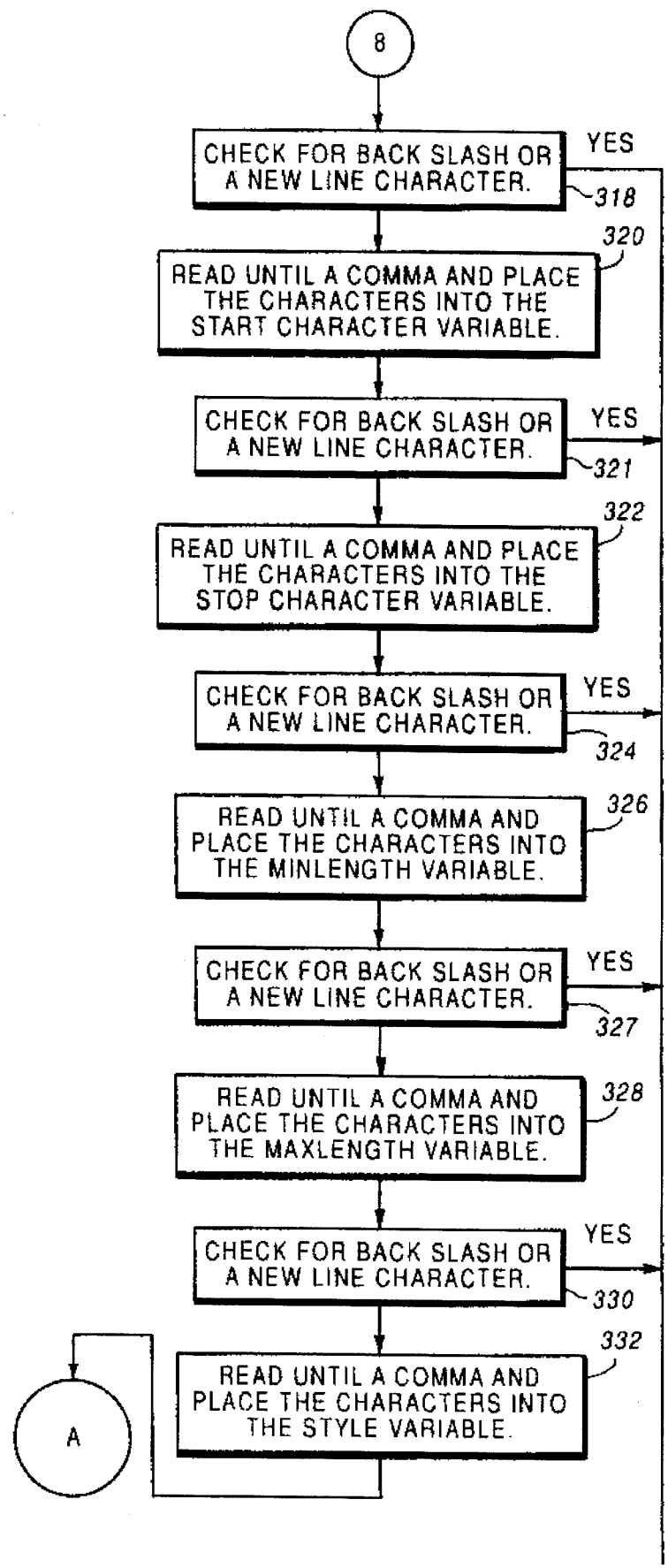
FIG-6F1

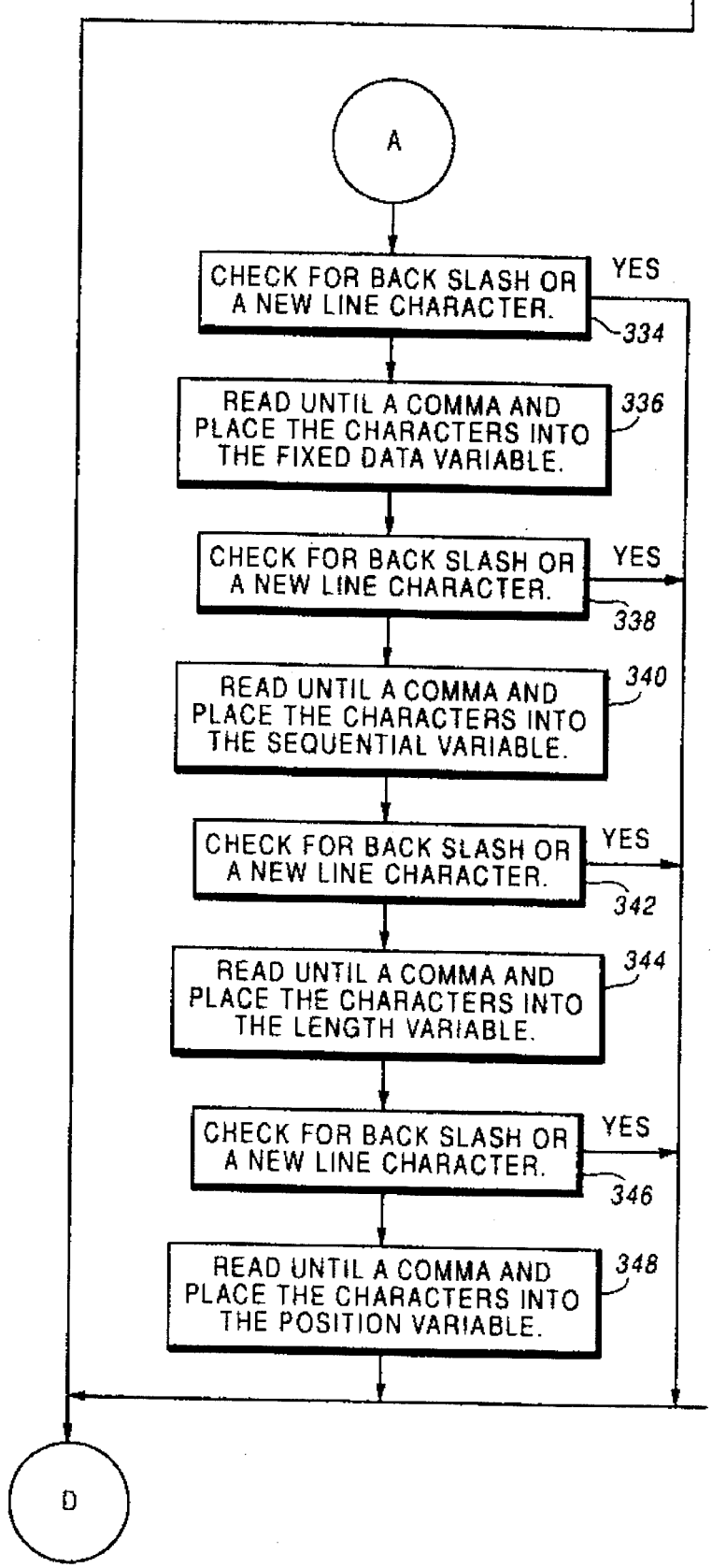
FIG-6F2

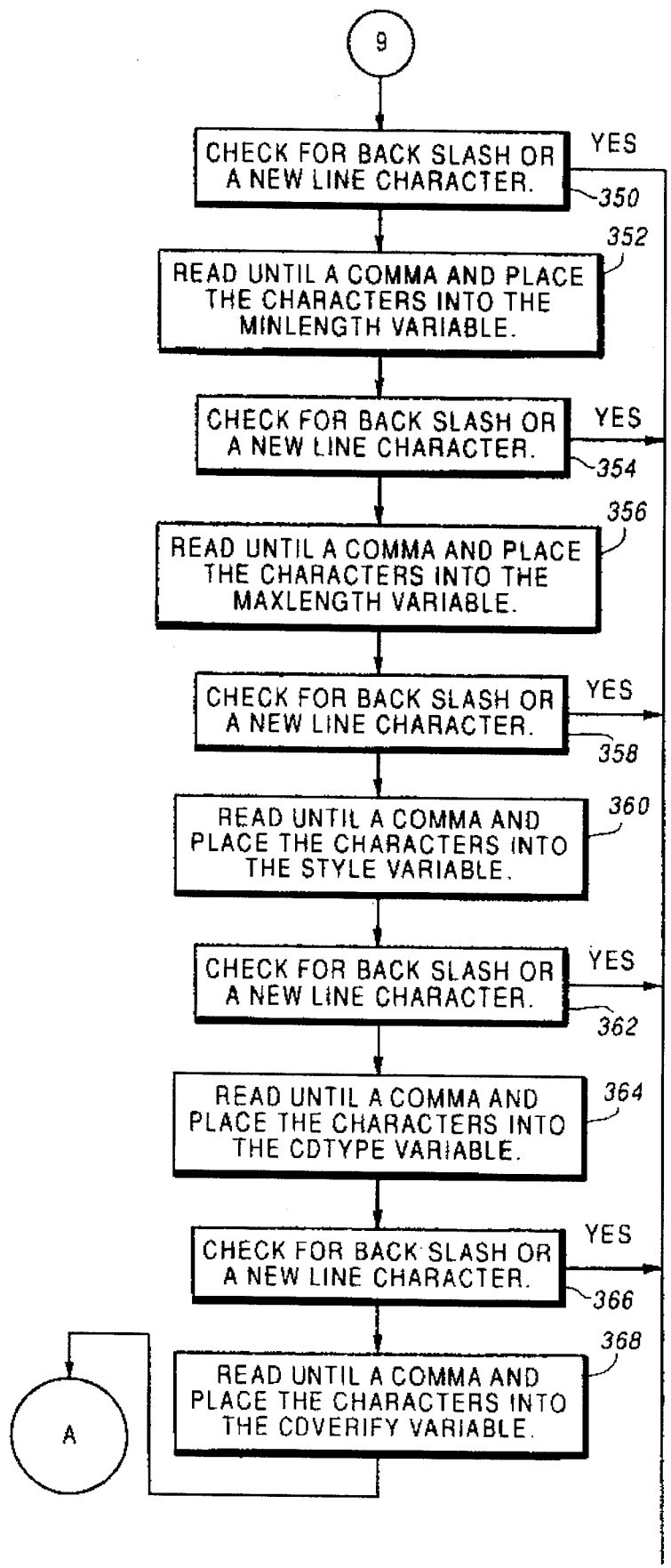
FIG-6G1

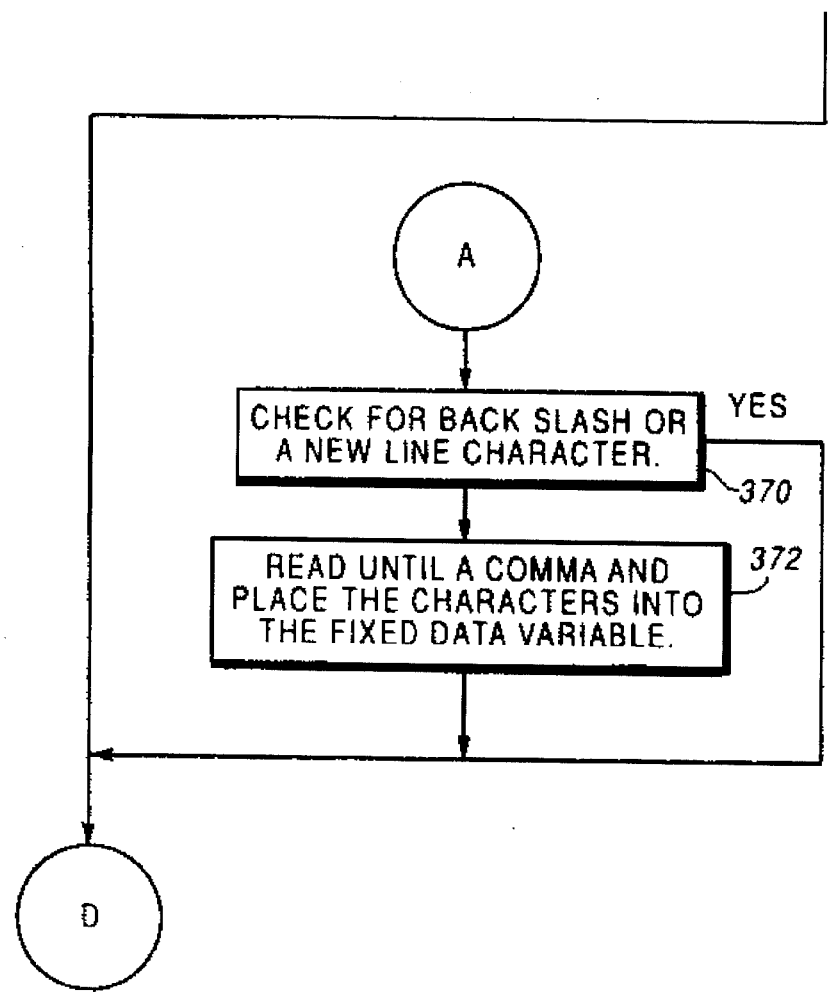
FIG-6G2

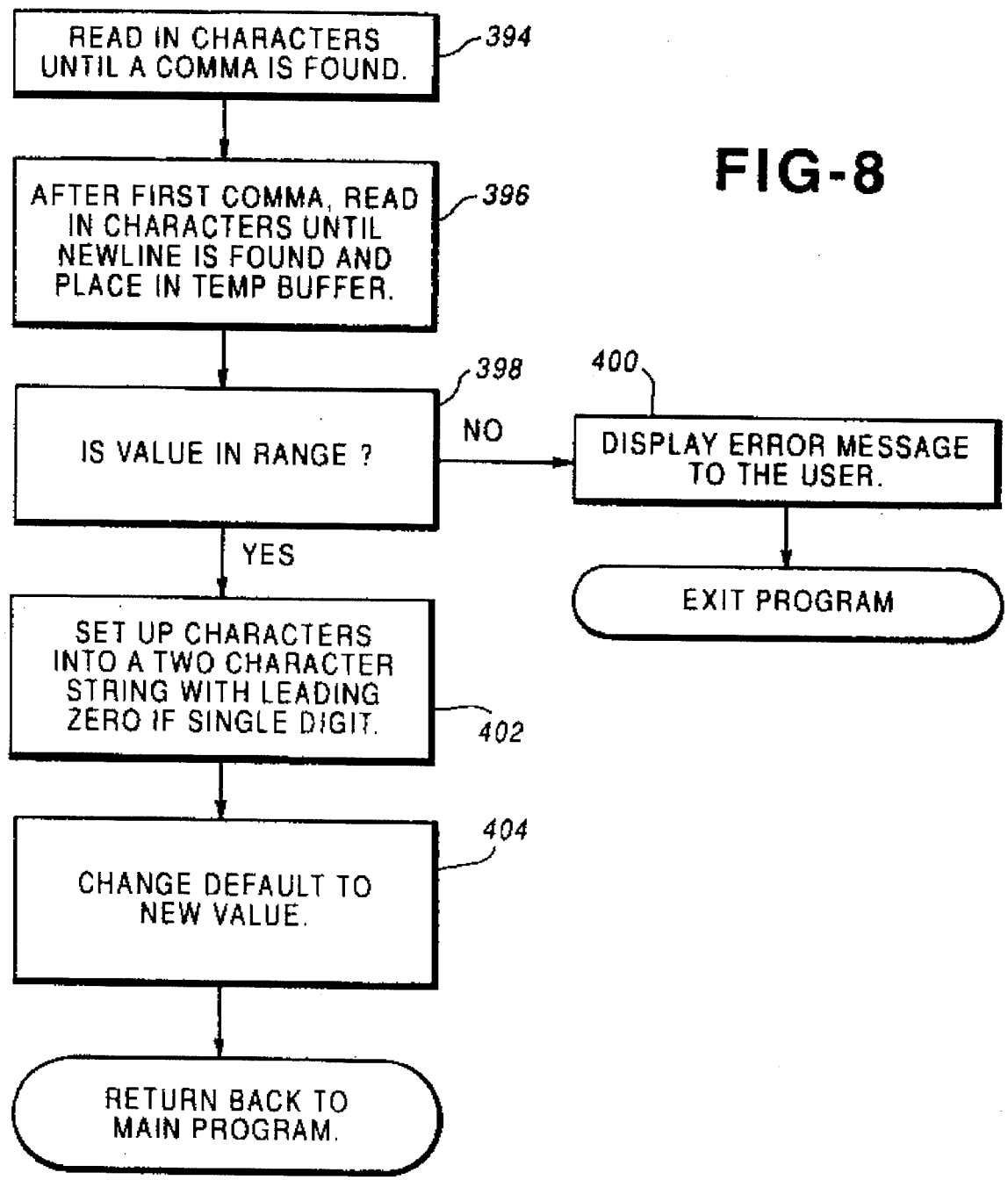

5,544,287

ON-LINE BARCODE PRINTER SYSTEM WITH MULTI-LEVEL USER PRINTER COMMANDS

TECHNICAL FIELD

The present invention is directed to an on-line barcode printer system, and more particularly to a host processing system for converting multi-level user input printer commands into a data stream in a predetermined printer language for communication to a barcode printer.

BACKGROUND OF THE INVENTION

A known barcode printer for printing on tags, labels, etc. receives, from a host processing system, a data packet and a format packet that controls a printing operation of the barcode printer. The format packet defines the various fields to be printed on the tag or label, the position of each field on the tag or label, the font type and size, as well as other attributes of the tag or label to be printed. The data packet defines the information to be printed in the various fields defined by the format packet. In order to print a job on this barcode printer, a user is typically required to create a format record and a separate data record for each field in a very cryptic printer language with each character of the respective record specifically defined in a programmer's manual. This is a time-consuming, laborious task even for a user familiar with the printer language. Further, because the creation of the format and data records is not a user-friendly operation, users with a low-level of printer language knowledge find the task difficult to accomplish.

SUMMARY OF THE INVENTION

In accordance with the present invention, the disadvantages of prior on-line barcode printing systems have been overcome. The on-line barcode printing system of the present invention utilizes multi-level user input printer commands, each of which combines format and data information where the multi-level user input commands are automatically converted to a predetermined barcode printer language to provide a system that is both user-friendly to a novice and flexible for a highly-skilled user.

More particularly, the system of the present invention is operable on a host processing system having an input device for entering printer commands. A barcode printer is responsive to a printer command data stream received from the host processing system in a predetermined printer language to print a barcode and/or alphanumeric information on a web of record members. The host processing system includes means for correlating each of a number of printer command functions with a number of multi-level user input printer commands. Each of the multi-level user input printer commands associated with a printer command function requires a different level of information to be entered by a user for its printer command function. The host processing system converts an entered multi-level user input command into a printer command data stream in the predetermined printer language utilizing the printer command function to which the multi-level user input command is correlated. The printer command data stream is then transmitted to the barcode printer.

In accordance with one feature of the present invention, each printer command function has an associated low-level user input command and a high-level user input command wherein the low-level user input command includes a user-readable word, whereas the high-level user input command includes an abbreviation of the word. Further, each printer command function has a number of associated format variables defining attributes of the printer command function. Default values are stored for each of the variables defining attributes of a printer command function to allow a user to enter a low-level user input command that does not include values for each of the variables. Alternatively, the user may enter for that same printer command function a high-level user input command that does include values for selective variables.

The multi-level user input commands are not fixed in length. They are therefore very flexible so as to allow a user to selectively specify values for only three format variables of the printer command function that are to be changed. If values for the format variables are not specified in the user input command, the system of the present invention automatically utilizes the default values stored for the variables, resulting in an extremely user-friendly system. Thus, a user can create a complex data stream containing both format and data information with a minimal amount of knowledge.

These and other objects, advantages, and novel features of the present invention, as well as details of an illustrated embodiment thereof, will be more fully understood from the following description and from the drawing.

BRIEF DESCRIPTION OF THE DRAWING

FIG. 2 is a flow chart illustrating a main software routine in accordance with the present invention;

FIGS. 6A–6G form a flow chart illustrating a barcode command function subroutine;

FIG. 8 is a flow chart illustrating a generalized command routine for setting various defaults and printer modes of the system of the present invention.

DESCRIPTION OF THE PREFERRED EMBODIMENT

Figure 1:
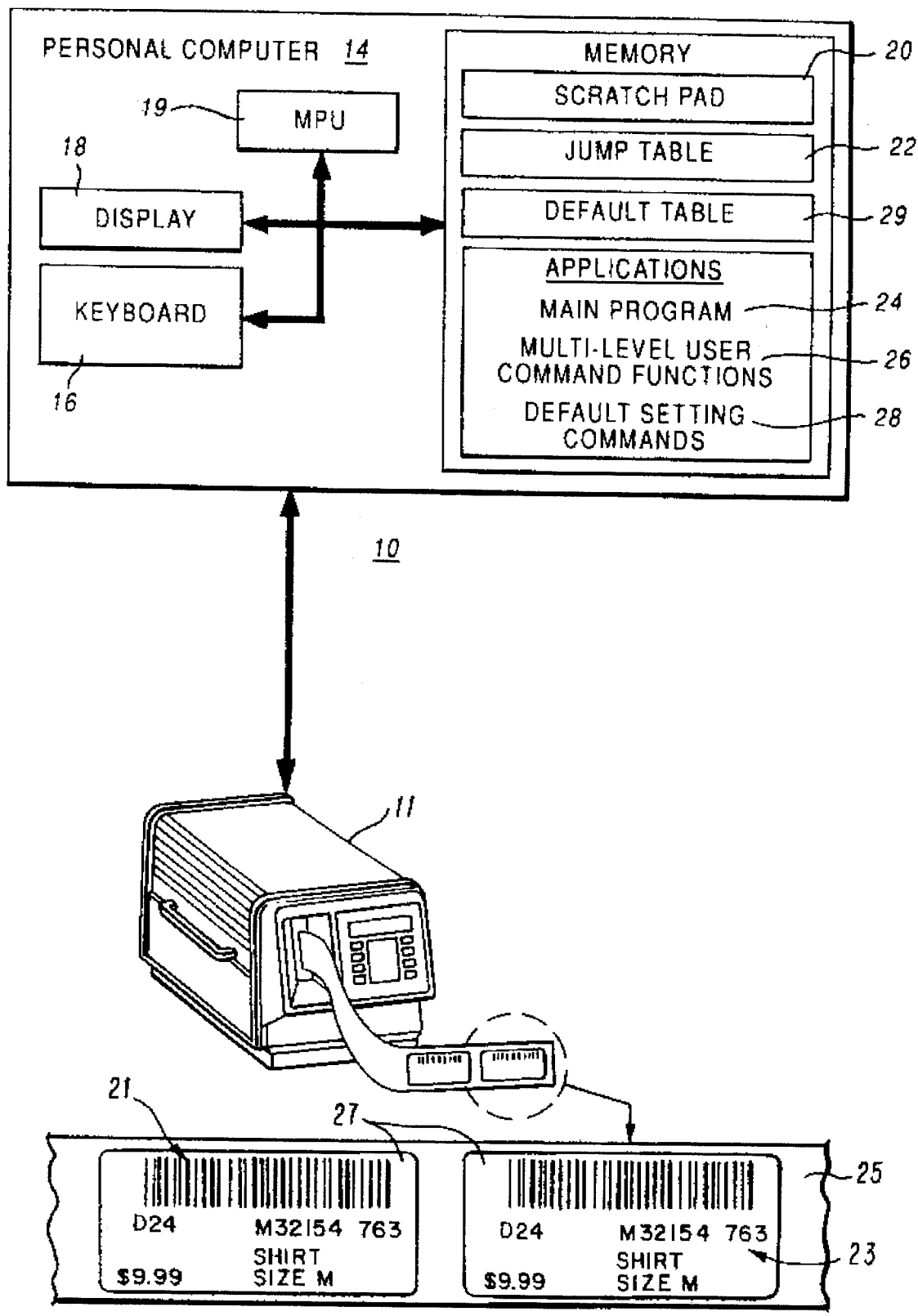
FIG. 1 is a block diagram of the on-line barcode printer system of the present invention.

The on-line barcode printer system 10 of the present invention includes a host processing system 14, such as a personal computer or the like, that converts user input printer commands of various levels into a data stream of the particular printer control language that is required by a barcode printer 11. The barcode printer 11 is responsive to a printer command data stream in the printer's predetermined control language to print a barcode 21 and/or alphanumeric information 23 on a web 25 of record members 27, such as tag, labels, etc. The host computer 14 may communicate with the barcode printer 11 via an RS 232 interface or the like.

The host processing system includes a keyboard 16 operable by a user for entering information into the system, such as user input printer commands, to create a job to be printed by the barcode printer 11. Although not shown, a mouse or other suitable input device may also be used. The host computer 14 includes a display 18 to prompt the user to enter particular information and to provide feedback to the user regarding the operation of the system. The host computer 14 also includes a microprocessor 19 that operates in accordance with application software stored in a memory 20.

The application software may include, for example, a standard text editor that is used to create a text file including one or more lines of commands. As discussed in detail below, the commands may be multi-level user input commands or default setting commands. The text file created is saved by the editor as an ASCII flat file, for example, in association with a file name assigned by the user. Upon entering the name of a main program, followed by the file name created by the user, the main program 24 is executed calling the various multi-level user command function routines 26 or default setting command routines 28 as required to convert the user input commands listed in the text file into the control language of the barcode printer 11. After interpreting each of the commands in the text file, if the barcode printer 11 is on-line, the main program 24 sends a file containing the converted commands as a data stream to the barcode printer 11 for printing in accordance therewith. The barcode printer 11 prints tags or labels in accordance with the received data stream in response to the actuation of a trigger button on the printer 11, or automatically in response to a trigger command contained within the received data stream.

The system 10 allows a user to select one of a number of printer command functions, such as a price command function, a text command function, an overlay command function, and a barcode command function, by entering via a keyboard 16 of the host computer 14 a multi-level user input command. Each printer command function represents a particular field of a label or tag to be printed. Each printer command function also has associated therewith a number of user input commands that are of various levels, i.e., multi-level user input commands. Each multi-level user input command associated with a given printer command function represents both format and data information. Each multi-level user input command specifies the data to be printed. For low-level input commands, however, the format information need not be specified within the command, the system 10 automatically utilizing default values stored in a table 29 for any format information that is not specified in the command. Low-level user input commands may take the form of a readable word, such as PRICE for a price command function; whereas a high-level user input command for the price command function may include merely an abbreviation of the word "price" such as PRC or P Because the system stores default values for various format variables, the multi-level user input commands are not fixed in length. For example, a low-level user input command may be formed of only the command word or abbreviation representing a printer command function followed by data with one or more separation characters therebetween. In response to such a command, the system correlates the command word or abbreviation to it's associated printer command function. The system then converts the command into the barcode printer's language, the system automatically utilizing the stored default values for the format variables of the printer command function. Alternatively, a high-level user input command might include the command word/abbreviation, followed by a list of specific values for all of the format variables, followed by the data. A mid-level command might include the command word/abbreviation, followed by specific values for only a few of the format variables, followed by the data. Thus, although the system of the present invention is very user-friendly and can be operated by a user with minimal knowledge of the system, it is also extremely flexible for high-level users.

More particularly, the price command function has three syntax levels for the multi-level user input commands. The three levels of the price command include the word PRICE and the abbreviations PRC and P. In order to specify values for all of the variables associated with the price function, a user enters one of the three syntax levels such as PRICE followed by the user-designated values for the associated format variables ordered as follows:

PRICE, X position, Y position, rotation, font type, font size, length, style, justify, \data A low-level user input command for the price command function might be, for example, PRICE,\3000. An intermediate-level user input command for the price command function might take the form of PRC, 10, 20, \3000; whereas a high-level user input command might take the form P, 10, 20, 90, 2, 2, 4, 1, 1, \3000. With regard to the first example illustrating a low-level user input command, the user need only type in the command syntax designation and the data for that field type, which in the example is interpreted as $30.00. The system of the present invention automatically utilizes default values to fill in the details needed by the barcode printer 11 as to the X and Y position of the price field, the rotation of the field, the font type and size to be used in printing, and the length, style and justification for the field, so that the user does not have to specify values. With regard to the second example illustrating an intermediate-level user input command, the abbreviation PRC is utilized instead of the word "price", and the x and y positions are respectively specified as 10 and 20, whereas the data again represents $30.00. In the third example, illustrating a high-level user input command, the shorter abbreviation P is utilized to designate the price command. In this example, the x position of the price field is specified as 10, the y position is specified as 20, the rotation of the field is 90°, the font is designated as a number 2 type which may represent, for example, a block-type of font, as opposed to an alphanumeric font or an alpha bold-type type of font. The second 2 represents the font size. The length of the price field is 4. The first 1 represents the style and the second 1 represents the justification of the field. Again, the data represents $30.00. When the low-level user input command is converted to the printer control language of the barcode printer 11, the host computer 14 may generate, for example, three lines of data as follows:

{FR_0111099I02\\\\\\\\\\\\\\\\1023085000504011}.
{RR_\000101I3000}
{TP}

In this printer control language the first line represents a format record, whereas the second line represents a data record. The last line is an on-line trigger command that instructs the barcode printer 11 to print a tag or label with the data specified in the data record according to the format specified in the format record. As can be seen, the data stream represented by these three lines is in a printer control language that is very cryptic; whereas, the multi-level user input commands are easily understood.

The text command function has three syntax levels for the multi-level user input commands. The three levels include the word TEXT and the abbreviations TXT and T. In order to specify all of the variables, a user enters one of the three syntax designations, followed by the values to be assigned to the commands associated format variables ordered as follows:

TEXT, X-pos, Y-pos, rotation, font, font size, minimum length, maximum length, fixed data, style, justify, check digit type, check digit verify, sequential count, length, position, \data.

Similarly, the overlay command function has three syntax levels for the multi-level user input commands. The three levels include the word OVERLAY and the abbreviations OVL and O. In order to specify all of the variables, a user enters one of the three syntax designations, followed by the values of the associated format variables ordered as follows:

OVERLAY, x-pos, y-pos, rotation, font, font size, \overlay.

The overlay command represents an information field that has fixed or non-changing data that can be used to describe another field. An example of such constant fields are "DATE:" or "SELL BY:".

A barcode command function also has three syntax levels for the multi-level user input commands. The three levels include the word BARCODE and the abbreviations BCD and B. In order to specify all of the variables, a user enters one of the three syntax designations followed by the values for the associated format variables ordered as follows:

Barcode, x-pos, y-pos, rotation, barcode type, bar height, appearance.

The various printer command functions discussed above represent common fields printed on a tag or label such as a price field, text field, overlay field and barcode field and each has associated multi-level user input commands. Default value setting commands are not multi-level user input commands, there being only one form of each command that is recognized by the system. The default setting commands may be used to change the default values specified for one or more printer command functions and some are used to allow the user to select various printer modes. More particularly, a FORMAT command allows a user to change or redefine the number identifying a format. A SCANTYPE command allows a user to designate a type of barcode scanner to be used in association with the system 10. A LABEL command allows a user to change the label size designated in the format header. The X command allows the user to change the horizontal position of the fields that are specified in the user created text file following this command. Similarly, the Y command allows a user to change the vertical position of the fields specified following the command. A FONT command allows a user to change the type of font to be utilized in the following fields, wherein the font types are 1=alphanumeric, 2=block, and 3=alpha bold. A FONTSIZE command allows a user to change the size of the font. A STYLE command allows a user to change the way in which data is formatted. For example, by utilizing this command, a user has the ability to place leading zeros in front of what is to be printed. The JUSTIFY command allows a user to change the default value for the type of justification required. For example, the justification option allows the user to have right, left, and center justified fields. A ROTATION command allows the user to change the orientation of the fields following the command by 0°, 90°, or 270°. A BARHEIGHT command allows a user to change the height of a barcode that is specified following the command. An APPEARANCE command allows a user to change the human readable content of a barcode field. For example, this command may be utilized to print a barcode without human readable characters or to print a barcode with a number system or a check digit. A MINLENGTH command allows a user to change the minimum length of the allowable data. Similarly, a MAXLENGTH command allows a user to change the maximum length of the allowable data. A CDTYPE command allows a user to change the method by which a check digit is generated. A CDVERIFY command allows a user to change how the check digit is generated, such as automatically or as provided by the data record. A SEQUENTIAL command allows a user to change a sequential count enable or disable routine. A ONDEMAND command allows a user to enable or disable a printer's on-demand feature. If, for example, the on-demand feature is enabled, the barcode printer 11 will print and dispense a label each time a previously printed and dispensed label is removed from the printer. A CURRENCY command allows a user to change the type of monitory symbol used in conjunction with the price field. A STRIP command allows a user to enable or disable a strip of labels option. If the strip of labels option is enabled, a strip of labels will automatically be printed by the barcode printer 11. A TRIGGER command allows a user to specify the number of labels to be printed. A MULTIPLE command allows a user to change the number of multiple labels that the printer produces. A SUPPLY command allows a user to change the amount of energy supplied to the printhead. This command is utilized to change the amount of energy, depending upon the type of supply used, such as paper supply or synthetic supply. An ENDCOUNT command allows a user to change the default value for the endcount in a sequential count field. A BARTYPE command allows a user to change the type of barcode to be used for the barcode fields specified following this command. A LENGTH command allows a user to specify the length in a sequential count field or in a price field.

After a user creates a text file, including one or more lines of multi-level user input commands and/or default setting commands in association with a file name, the user is prompted via the display 18 to enter the name of the main program depicted in FIG. 2, followed by the name of the text file to be interpreted. Thereafter, the microprocessor 19 executes the software illustrated by the main program. More particularly, at a block 30 the microprocessor 19 checks for the existence of the text file name specified by the user. Thereafter, the microprocessor 19 at a block 32 initializes all of the global variables in a scratch pad memory to the default values specified in the default value table 29. At block 34, the microprocessor 19 determines whether the specified text file exists and, if not, the microprocessor 19 exits the routine. If the text file does exist, however, the microprocessor proceeds to block 36 to begin reading the commands listed in the text file line by line to check for a match between the listed command and the commands set out in a jump table 22 stored in the memory 20. The jump table 22 correlates each of the possible multi-level user input commands, such as PRICE, PRC, P, TEXT, TXT, T, Barcode, BCD, B, OVERLAY, OVL, and O, with a respective printer command function, such as the price command function, the text command function, the barcode command function, and the overlay command function. At block 38 the microprocessor 19 determines whether a listed command matches a multi-level user input command stored in the jump table and, if not, the microprocessor exits the routine. If a match is found, however, the microprocessor proceeds to block 40 to execute the command function subroutine correlated with the listed command. After executing the appropriate command function routine with no errors, the microprocessor proceeds from block 40 to block 42 to determine whether the end of the user created text file has been reached. If not, the microprocessor proceeds to block 44 to get the command specified in the next line of the text file and thereafter proceeds to block 38 to determine if that next command has a match in the jump table 22. If the microprocessor determines at block 42 that the end of the text file has been reached, the microprocessor proceeds to block 46 to write the format and data buffers created when the various command routines are executed to a file, as discussed in detail below. Thereafter, at block 48, the microprocessor 19 determines whether the barcode printer 11 is on-line. If it is, the microprocessor proceeds to block 50 to write the commands, which have been converted to the barcode printer's control language, to the printer. After the data stream representing the commands in the printer's control language has been transmitted to the barcode printer 11, the microprocessor 19 exits the routine depicted in FIG. 2.

Figure 3A:
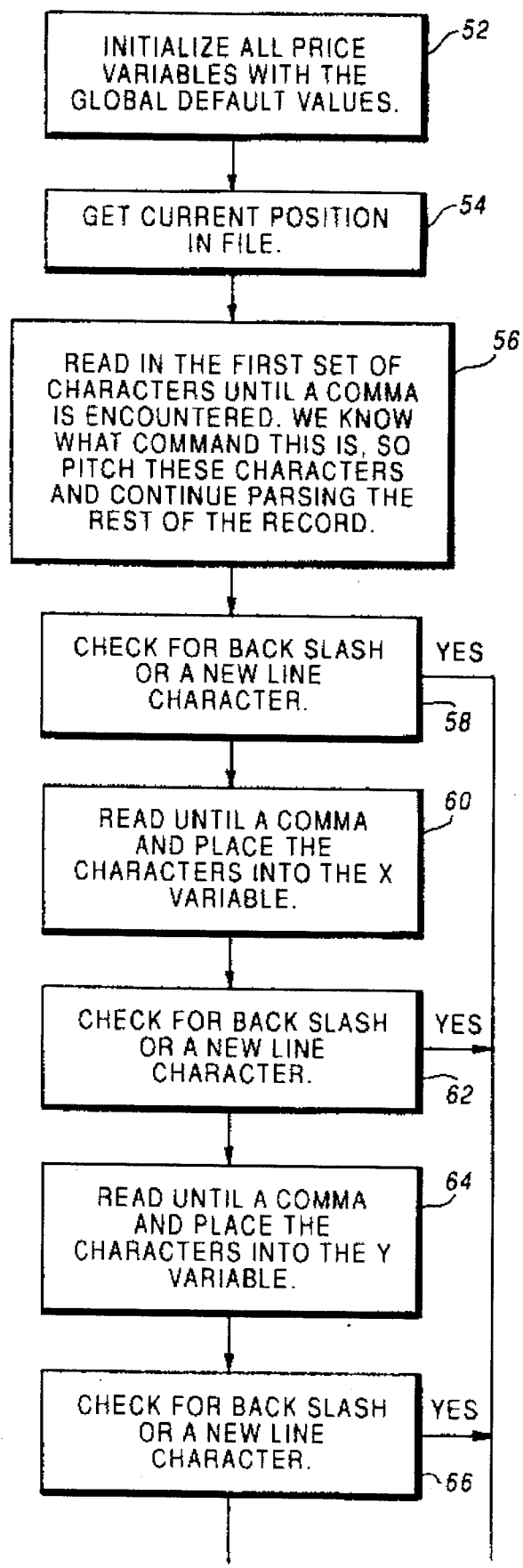
FIG. 3 is a flow chart illustrating a price command function subroutine.
Figure 3B:
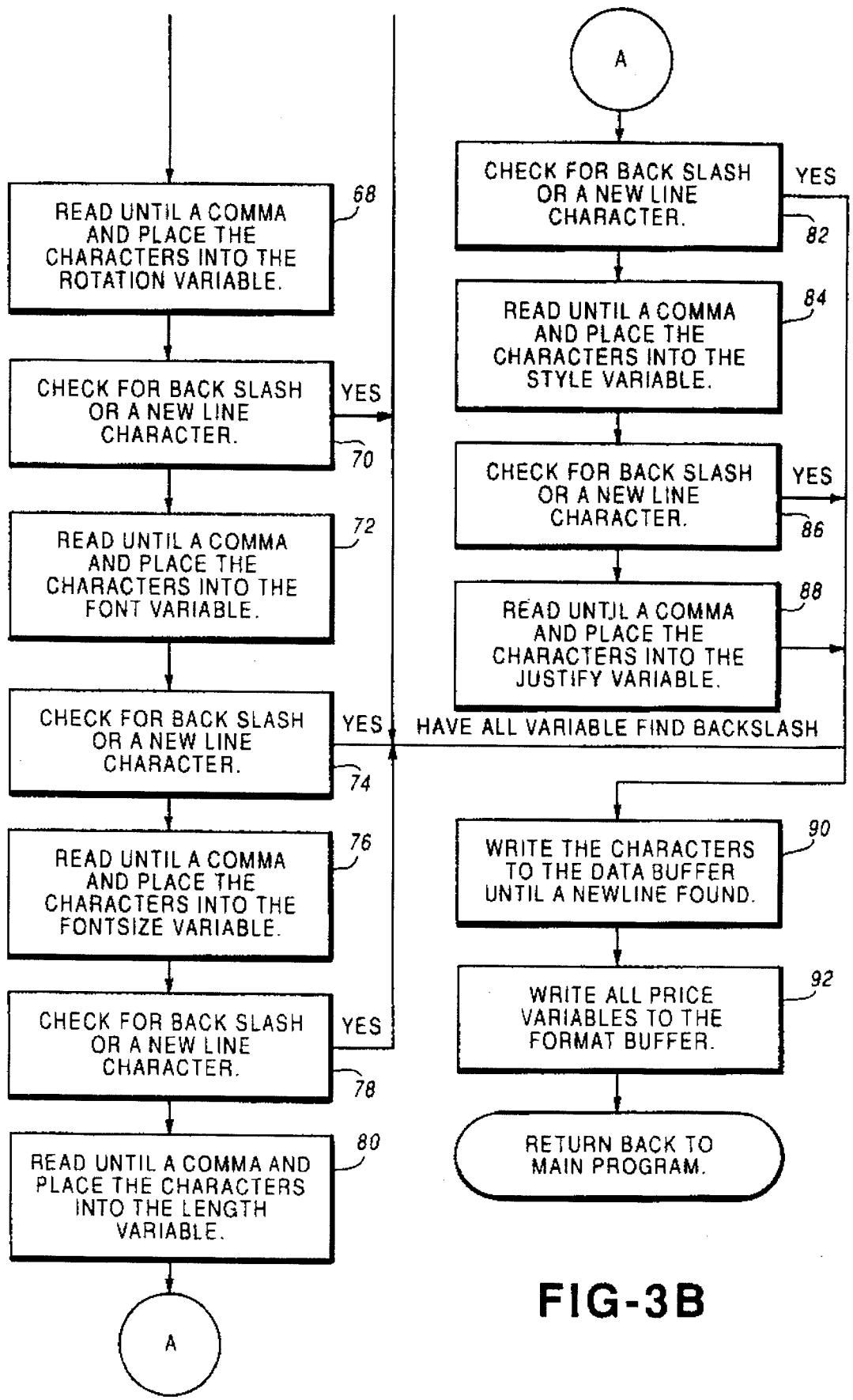

The price command function executed at block 40 in response to a multi-level user input price command, such as PRICE, PRC or P, is illustrated in FIG. 3. At the start of this routine, the microprocessor 19 at a block 52, initializes all of the price format variables in a portion of the scratch pad memory with the stored global default values. Thereafter, at a block 54, the microprocessor gets the current position in the user-created text file, and at block 56, reads in the first set of characters until a comma is encountered. This first set of characters represents one of the three syntax designations of the price command, i.e., PRICE, PRC, or P. Since the microprocessor knows that these characters represent the price command, they are ignored and the microprocessor 19 proceeds to block 58 to continue the parsing of the price text file line.

At block 58, the microprocessor checks for a backslash or a new line character. If, for example, a backslash is encountered, the microprocessor 19 knows that the characters that follow the backslash are data characters. Therefore, the microprocessor 19 proceeds to block 90 to write the characters following the backslash to a data buffer until a new line is found. At block 90, the microprocessor 19 generates the data record in the printer control language required by the barcode printer 11. From block 90, the microprocessor 19 proceeds to block 92 to write all of the price variables to the format buffer. In doing so, the microprocessor 19 converts the price format variables into the printer control language by creating a format record in that printer language with the variables specified. Because the multi-level user input command did not specify any of the format variables if the microprocessor proceeded to block 90 directly from block 58, the price variables included in the converted format record are specified as having the stored default values. After converting the multi-level user input command to a data stream in the printer's control language at blocks 90 and 92, the microprocessor returns to the main program depicted in FIG. 2.

If the multi-level user input price command specifies values for one or more of the format variables associated with the command, the microprocessor 19 proceeds from block 58 to block 60. If a value for the X position variable has been specified, the microprocessor replaces the default value stored in the scratch pad memory for the x position price variable with the characters encountered until the next comma is reached. If no characters are encountered prior to the next comma, the default value for the x variable is maintained in the scratch pad memory and utilized at block 92 in creating the format record. After checking for a specified value for the x variable, the microprocessor 19 proceeds from block 60 to block 62 to check for a backslash or a new line character. If a backslash is encountered, the microprocessor proceeds from block 62 to block 90, as discussed above. If a backslash is not encountered, the microprocessor proceeds to block 64 to check for a specified value for the y position variable. If a value has been specified, the microprocessor replaces the default value stored in the scratch pad memory for the y variable with the encountered characters until a comma is reached. Thereafter, the microprocessor proceeds to block 66 to check for a backslash or a new line character. If a backslash is specified, the microprocessor proceeds to block 90. If, however, a backslash is not encountered, the microprocessor 19 proceeds to block 68 to replace the default value for the rotation variable with the characters encountered until the next comma is reached. If no characters between commas are encountered, the microprocessor proceeds to block 70 without altering the default value stored for the rotation variable. At block 70, the microprocessor checks for a backslash or a new line character. If a backslash is encountered, the microprocessor proceeds to block 90. If, however, a backslash is not encountered, the microprocessor proceeds to block 72 to replace the default value for the font variable with the encountered characters until a comma is reached. If no characters are encountered, the default value is not replaced. Thereafter, if a backslash is encountered, the microprocessor proceeds to block 90 from block 74. If, however, a backslash is not encountered, the microprocessor proceeds to block 76 to read the characters until the next comma is reached. If characters are encountered before the next comma, the default value for the font size variable is replaced with the encountered characters. Otherwise, the default value stored for the font size variable in the scratch pad memory is not replaced. If a backslash is thereafter encountered, as determined at block 78, the microprocessor proceeds to block 90. If, however, a backslash is not encountered, the microprocessor proceeds to block 80 from block 78. At block 80, the microprocessor 19 reads until a comma is encountered. Any characters encountered prior to the comma are used to replace the default value for the length variable in the scratch pad memory. If characters are not encountered prior to the next comma, the default values in the scratch pad memory are used for the length variable. From block 80, the microprocessor proceeds to block 82. If a backslash is encountered, the microprocessor proceeds to block 90 from block 82. If, however, a backslash is not encountered, the microprocessor proceeds from block 82 to block 84. At block 84 the microprocessor 19 reads until a comma is encountered. If characters are encountered prior to the next comma, they are used to replace the default value for the style variable in the scratch pad memory. If characters representing the value of a style variable are not encountered, the microprocessor proceeds from block 84 to block 86 without replacing the default value for the style variable in the scratch pad memory. The microprocessor 19 proceeds to block 90 from block 86 if a backslash is thereafter encountered. If, however, a backslash is not encountered, the microprocessor proceeds to block 88 to read until the next comma is encountered. If characters are encountered prior to the next comma, the encountered characters are used to replace the default value for the justify variable in the scratch pad memory. If no characters are encountered, the microprocessor proceeds to block 90 without replacing the default value. After converting to the printer's control language at block 90, the data characters specified in the multi-level user command, and at block 92 the format information either specified in the multi-level user command or stored as default values, the microprocessor 19 returns to the main program depicted in FIG. 2.

As seen from the above, the multi-level user input price commands may be variable in length. The shortest command may include only one of the command designations such as PRICE, PRC or P and data following a comma and backslash. The longest command will include one of the command designations followed by values for each of the format variables. A midsize command may include one of the command designations followed by a pair of commas for each variable in the ordered list for which a value is not to be specified plus values for any format variables to be specified. For example, the command P, , , 90,\3000 represents the price command function wherein a value, 90°, is specified for only the rotation variable. Commas with no characters therebetween indicate that the default values are to be used for the X and Y positions. However, no commas are needed for the variables following the value of the rotation variable because the backslash symbol follows the rotation variable value.

Figure 4A:
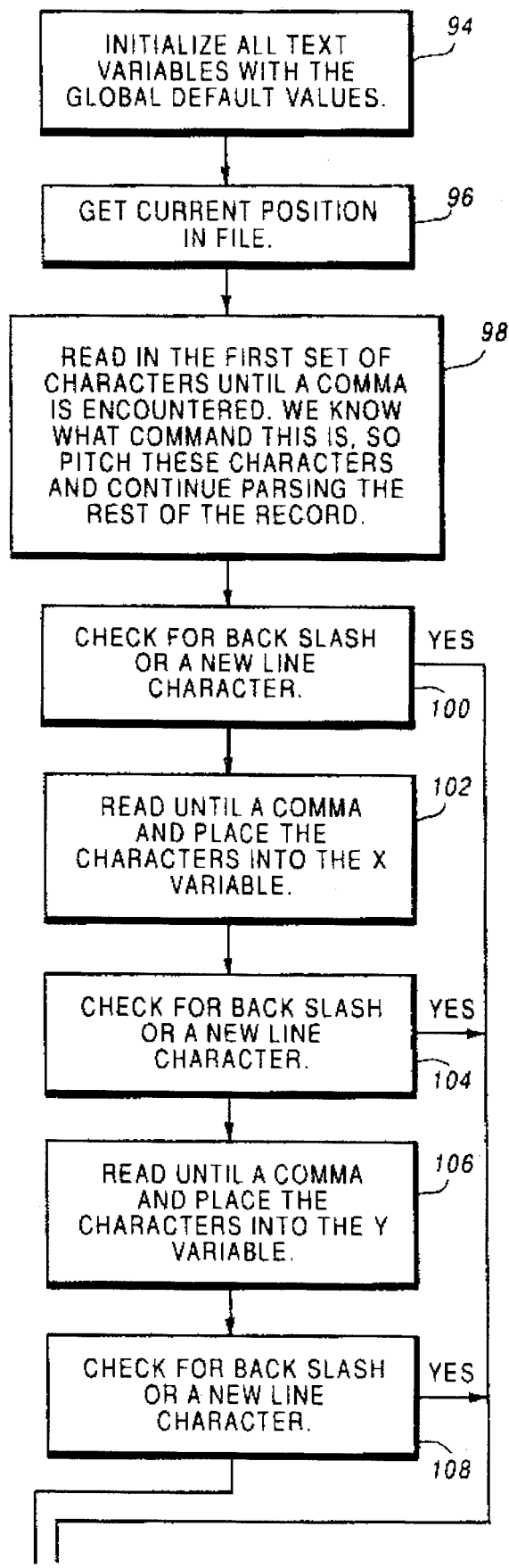
FIG. 4 is a flow chart illustrating a text command function subroutine.
Figure 4B:
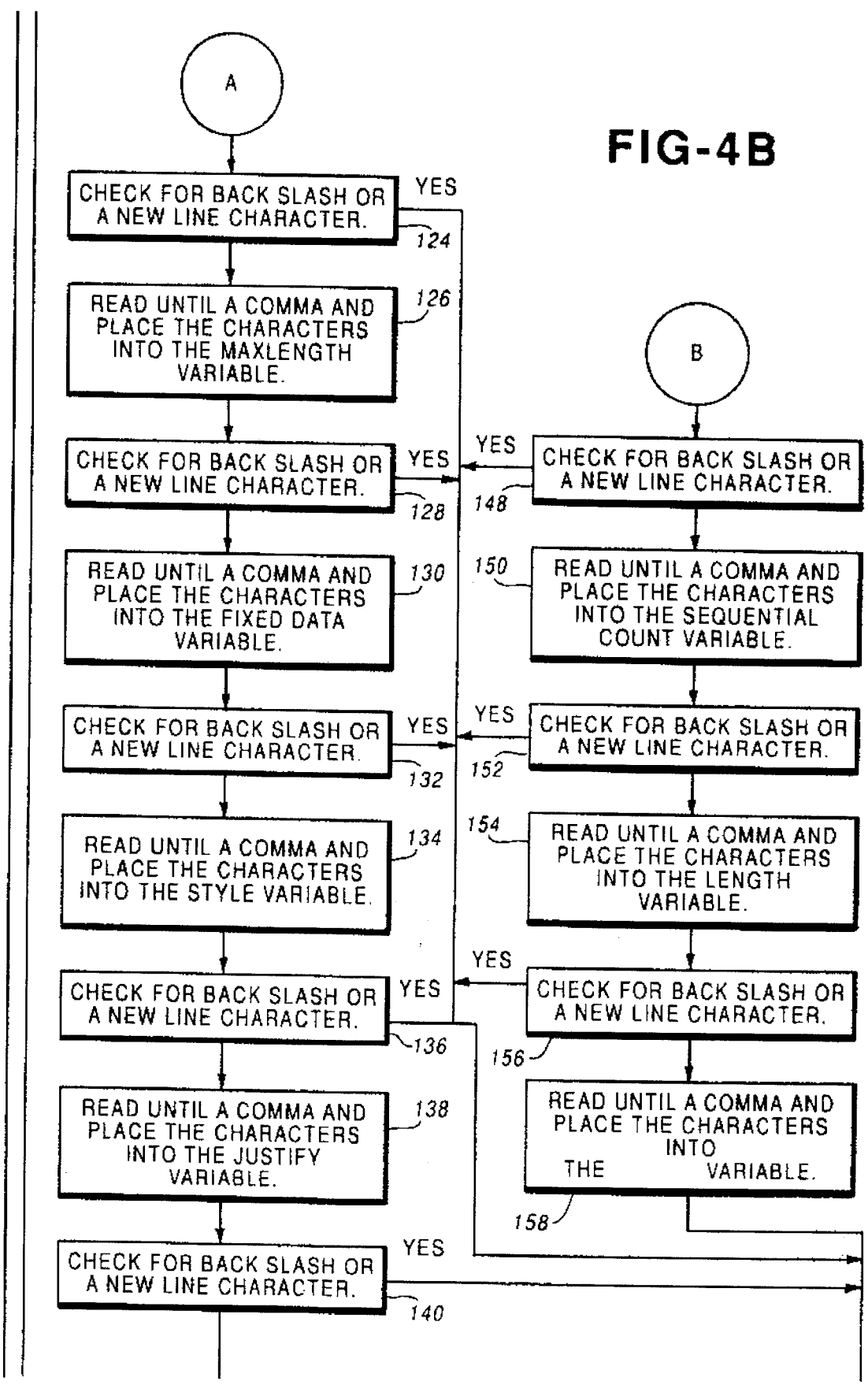
Figure 4C:
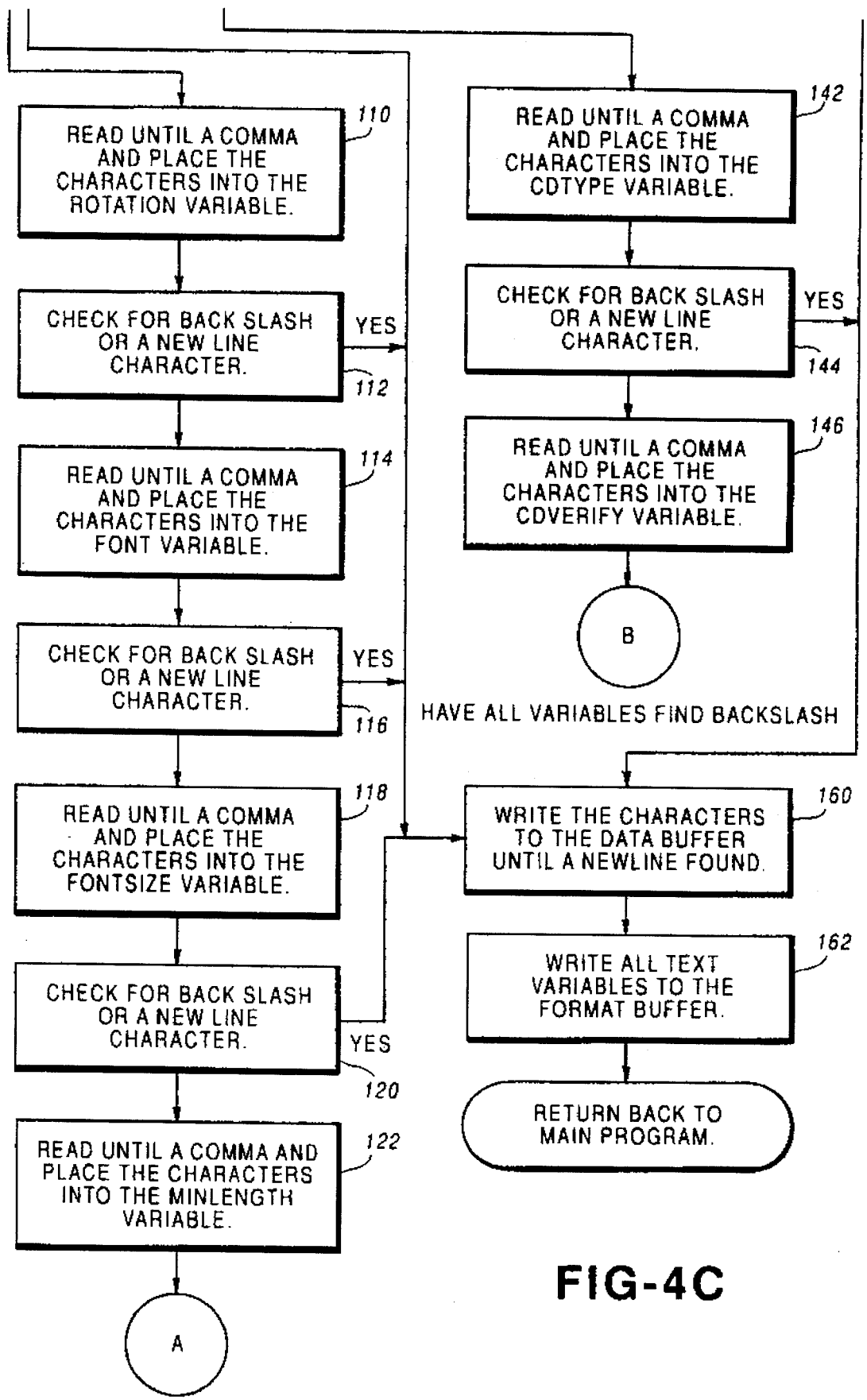

The text command function is illustrated in FIG. 4. At the start of this routine at block 94, the microprocessor 19 initializes in the scratch pad memory all of the text variables with the global default values. As in the price command function, if the multi-level user input command does not specify a value for a given default value, so as to replace the default value in the scratch pad memory, the default value for that variable will be used in converting the multi-level user input command into a data stream in the printer control language of the barcode printer 11. From block 94, the microprocessor 19 proceeds to block 96 to get the current position in the user-created file. Thereafter, at block 98, the microprocessor 19 reads in the first set of characters until a comma is encountered. This first set of characters is ignored since the microprocessor 19 knows that they represent the text command. From block 98, the microprocessor 19 proceeds to block 100. If a backslash is encountered, the microprocessor proceeds from block 100 to blocks 160 and 162 to convert the multi-level user input command to the printer's control language, as discussed above with respect to blocks 90 and 92. If a backslash is not encountered, the microprocessor proceeds to block 102. At block 102, the microprocessor 19 checks to determine whether the multi-level user input text command specifies a value for the x variable and, if so, the microprocessor 19 replaces the default value for the x variable in the scratch pad memory with the specified value, thereafter proceeding to block 104. If the command does not specify a value for the x variable, the microprocessor 19 proceeds from block 102 to block 104 without replacing the default value for that variable in the scratch pad memory. If the microprocessor determines that a backslash is encountered at block 104, it proceeds to block 160. If, however, a backslash is not encountered, the microprocessor proceeds to block 106. At block 106, the microprocessor 19 checks to determine whether the multi-level user input text command specifies a value for the y variable and, if so, the microprocessor 19 replaces the default value for the y variable with the specified value, thereafter proceeding to block 108. If the command does not specify a value for the y variable, the microprocessor 19 proceeds from 106 to block 108 without replacing the default value for that variable in the scratch pad memory. If a backslash is next encountered, the microprocessor proceeds from block 108 to block 160. If, however, a backslash is not encountered, the microprocessor 19 proceeds to block 110. At block 110, the microprocessor 19 checks to determine whether the multi-level user input text command specifies a value for the rotation variable and, if so, the microprocessor 19 replaces the default value for the rotation variable with the specified value, thereafter proceeding to block 112. If the command does not specify a value for the rotation variable, the microprocessor 19 proceeds from block 110 to block 112 without replacing the default value for that variable in the scratch pad memory. If the microprocessor determines that a backslash is next encountered, the microprocessor proceeds to block 160 from block 112. If a backslash is not encountered, however, the microprocessor proceeds from block 112 to block 114. At block 114, the microprocessor 19 checks to determine whether the multi-level user input text command specifies a value for the font variable and, if so, the microprocessor 19 replaces the default value for the y variable with the specified value, thereafter proceeding to block 116. If the command does not specify a value for the font variable, the microprocessor proceeds from block 114 to block 116 without replacing the default value for that variable in the scratch pad memory. At block 116, the microprocessor checks for a backslash or a new line character, and if a backslash is encountered, the microprocessor proceeds to line 160. If, however, a backslash is not encountered, the microprocessor proceeds to block 118. At block 118, the microprocessor 19 checks to determine whether the multi-level user input text command specifies a value for the font size variable and, if so, the microprocessor 19 replaces the default value for the font size variable with the specified value, thereafter proceeding to block 120. If the command does not specify a value for the font size variable, the microprocessor proceeds from block 118 to block 120 without replacing the default value for that variable in the scratch pad memory. If a backslash is next encountered at block 120, the microprocessor proceeds to block 160. If, however, a backslash is not encountered, the microprocessor proceeds to block 122. At block 122, the microprocessor 19 checks to determine whether the multi-level user input text command specifies a value for the minlength variable and, if so, the microprocessor 19 replaces the default value for the minlength variable with the specified value, thereafter proceeding to block 124. If the command does not specify a value for the minlength variable, the microprocessor proceeds from block 122 to block 124 without replacing the default value for that variable in the scratch pad memory. If a backslash is thereafter encountered, the microprocessor proceeds from block 124 to block 160 and, if not, the microprocessor proceeds from block 124 to block 126. At block 126, the microprocessor 19 checks to determine whether the multi-level user input text command specifies a value for the maxlength variable and, if so, the microprocessor 19 replaces the default value for the maxlength variable with the specified value, thereafter proceeding to block 128. If the command does not specify a value for the maxlength variable, the microprocessor proceeds from block 126 to block 128 without replacing the default value for that variable in the scratch pad memory. If a backslash is next encountered, the microprocessor 19 proceeds from block 128 to block 160 and, if not, the microprocessor proceeds from block 128 to block 130. At block 130, the microprocessor 19 checks to determine whether the multi-level user input text command specifies a value for the fixed data variable and, if so, the microprocessor 19 replaces the default value for the fixed data variable with the specified value, thereafter proceeding to block 132. If the command does not specify a value for the fixed data variable, the microprocessor proceeds from block 130 to block 132 without replacing the default value for that variable in the scratch pad memory. If a backslash is next encountered, the microprocessor 19 proceeds from block 132 to block 160 and, if it is not encountered, the microprocessor proceeds from block 132 to block 134. At block 134, the microprocessor 19 checks to determine whether the multi-level user input text command specifies a value for the style variable and, if so, the microprocessor 19 replaces the default value for the style variable with the specified value, thereafter proceeding to block 136. If the command does not specify a value for the style variable, the microprocessor 19 proceeds from block 134 to block 136 without replacing the default value for that variable in the scratch pad memory. If a backslash is next encountered, the microprocessor proceeds from block 136 to block 160. If, however, a backslash is not encountered, the microprocessor proceeds from block 136 to block 138. At block 138, the microprocessor 19 checks to determine whether a multi-level user input text command specifies a value for the justify variable and, if so, the microprocessor 19 replaces the default value for the justify variable with the specified value, thereafter proceeding to block 140. If the command does not specify a value for the justify variable, the microprocessor proceeds from block 138 to block 140 without replacing the default value for that variable in the scratch pad memory. If a backslash is next encountered, the microprocessor 19 proceeds from block 140 to block 160, and if it is not encountered, the microprocessor proceeds from block 140 to block 142. At block 142, the microprocessor checks to determine whether the multi-level user input text command specifies a value for the check digit-type variable and, if so, the microprocessor 19 replaces the default value for the check digit-type variable with the specified value, thereafter proceeding to block 144. If the command does not specify a value for the check digit-type variable, the microprocessor 19 proceeds from block 142 to block 144 without replacing the default value for that variable in the scratch pad memory. If a backslash is next encountered at block 144, the microprocessor proceeds to block 160 and, if it is not encountered, the microprocessor proceeds from block 144 to block 146. At block 146, the microprocessor 19 checks to determine whether the multi-level user input text command specifies a value for the check digit verify variable and, if so, the microprocessor 19 replaces the default value for the check digit verify variable with the specified value, thereafter proceeding to block 148. If the command does not specify a value for the check digit verify variable, the microprocessor proceeds from block 146 to block 148 without replacing the default value for that variable in the scratch pad memory. At block 150, the microprocessor 19 checks to determine whether the multi-level user input text command specifies a value for the sequential count variable and, if so, the microprocessor 19 replaces the default value for the sequential count variable with the specified value, thereafter proceeding to block 150. If the command does not specify a value for the sequential count variable, the microprocessor proceeds from block 150 to block 152 without replacing the default value for that variable in the scratch pad memory. If a backslash is next encountered, the microprocessor proceeds from block 152 to block 160 and, if it is not encountered, the microprocessor proceeds from block 152 to block 154. At block 154, the microprocessor 19 checks to determine whether the multi-level user input text command specifies a value for the length variable and, if so, the microprocessor 19 replaces the default value for the length variable with the specified value, thereafter proceeding to block 156. If the command does not specify a value for the length variable, the microprocessor proceeds from block 154 to block 156 without replacing the default value for that variable in the scratch pad memory. If a backslash is next encountered, the microprocessor proceeds from block 156 to block 160, and if it is not encountered, the microprocessor proceeds from 156 to block 158. At block 158, the microprocessor 19 checks to determine whether the multi-level user input text command specifies a value for the position variable and, if so, the microprocessor 19 replaces the default value for the position variable with the specified value, thereafter proceeding to block 160. If the command does not specify a value for the position variable, the microprocessor proceeds from block 158 to block 160 without replacing the default value for that variable in the scratch pad memory. The microprocessor 19 at blocks 160 and 162 converts the multi-level user input text command into a data stream in the printer's control language as discussed above with respect to blocks 90 and 92.

Figure 5A:
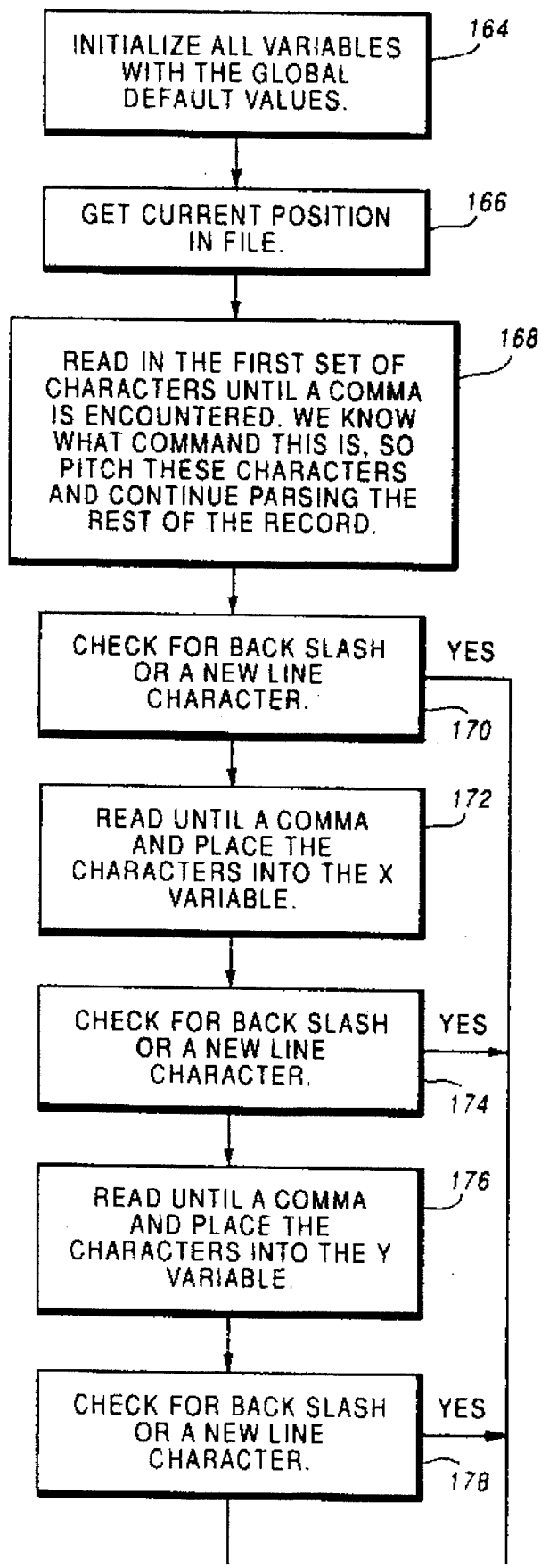
FIG. 5 is a flow chart illustrating an overlay command function subroutine.
Figure 5B:
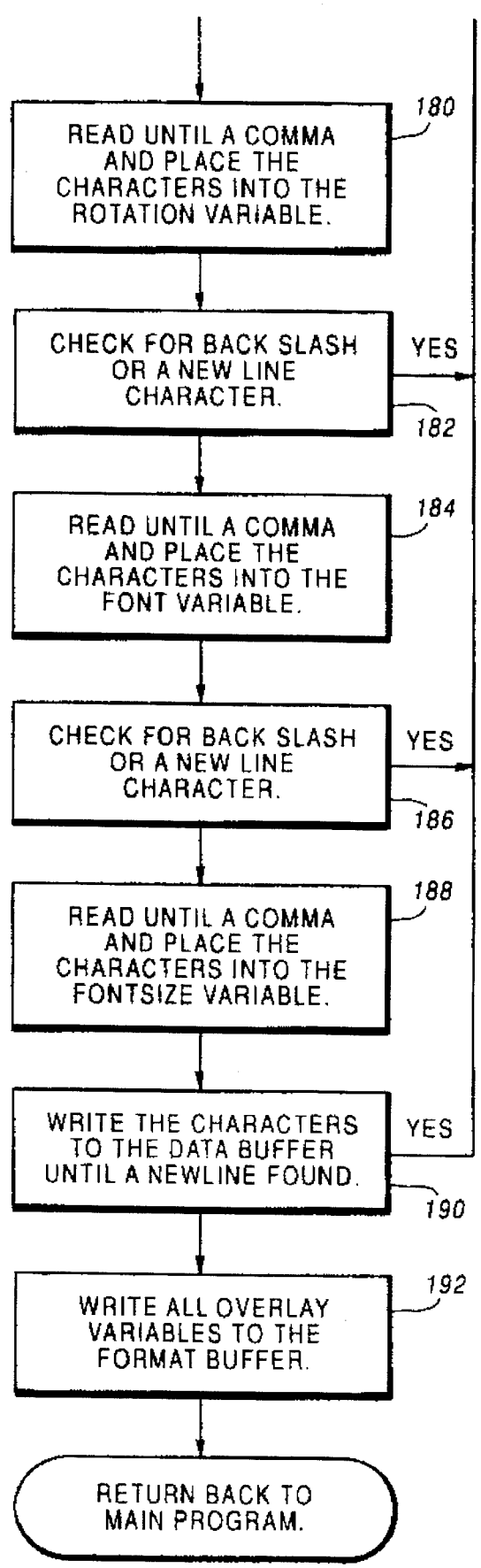

FIG. 5 illustrates the overlay command function. At the start of the overlay command function subroutine, the microprocessor 19 at block 164 initializes all of the overlay variables by storing the default values for the overlay variables in an area of the scratch pad memory. Thereafter, the microprocessor 19 at a block 166 gets the current position in the user created text file. At block 168, the microprocessor 119 next reads in the first set of characters until a comma is encountered. The microprocessor 19 knows that this first set of characters represents one of the syntax designations for the overlay command and therefore ignores these characters. From block 168, the microprocessor proceeds to block 170 to determine whether a backslash is next encountered indicating that data is to immediately follow. If a backslash is encountered, the microprocessor proceeds from block 170 to blocks 190 and 192 to convert the multi-level user input overlay command into a data stream of the printer control language of the barcode printer 11 as discussed above in detail with respect to blocks 90 and 92. If a backslash is not encountered at block 170, the microprocessor proceeds to determine whether the multi-level user input overlay command specifies a value for the x variable at block 172, the y variable at block 176, the rotation variable at block 180, the font variable at block 184, and the font size variable at block 188. If the multi-level user input overlay command specifies a value for one or more of these variables, the microprocessor 19 replaces the default value for the variable at respective blocks 172, 176, 180, 184 and 188. If the command does not specify a value for a given variable, the microprocessor proceeds without replacing the default value for that variable in the scratch pad memory. After checking for the presence of a value for a given variable, the microprocessor determines whether a backslash is next encountered at a respective block 174, 178, 182 or 186. If a backslash is encountered, the microprocessor determines that data is to follow the backslash and no values are specified for subsequently checked variables so that the microprocessor proceeds from the respective block 174, 178, 182 or 188 directly to block 190. After converting the multi-level user overlay command at blocks 190 and 192 into the requisite printer language, the microprocessor returns to the main program depicted in FIG. 2.

The barcode command functions are illustrated in FIGS. 6A–G. At the start of this routine, the microprocessor at a block 194 initializes all of the barcode variables by storing default values for each of the barcode variables in a scratch pad portion of the memory 20. Thereafter, at block 196, the microprocessor 19 gets the current position in the user created text file and proceeds to block 198. At block 198, the microprocessor reads in the first set of characters until a comma is encountered. At this point, the microprocessor 19 knows that the first set of characters represents one of the three syntax levels of the barcode command and so ignores these characters. The microprocessor proceeds from block 198 to block 199 to determine whether a backslash is next encountered and if so proceeds to blocks 222 and 224 to convert the multi-level user input barcode command to the requisite printer language as discussed above in detail for blocks 90 and 92. If a backslash is not encountered after the first set of characters as determined at block 199, the microprocessor 19 checks to determine whether the multi-level user input barcode command specifies a value for the x variable, the y variable, the rotation variable, the barcode variable, the bar height variable and the appearance variable at respective blocks 200, 204, 208, 212, 216 and 220. If the microprocessor 19 determines that a value is specified for one or more of these variables, the microprocessor replaces at respective blocks 200, 204, 208, 212, 216 and 220 the default value for the respective variable with the specified value. If the command does not specify a value for one of the variables, the microprocessor proceeds to check the next variable in the list without replacing the default value for that variable in the scratch pad memory. If the microprocessor encounters a backslash at a respective block 202, 206, 210, 214 or 218, the microprocessor proceeds from that block directly to block 222 since a backslash indicates that data is to follow.

If the microprocessor determines that the barcode type specified in the multi-level user input barcode command is of types 1–4, the microprocessor proceeds from block 220 to block 226. At block 226 the microprocessor checks for a backslash and if one is encountered the microprocessor proceeds to block 222. If a backslash is not encountered as determined at block 266, the microprocessor 19 checks to determine whether the multi-level user input barcode command specifies a value for the check digit verify variable, the fixed data variable, the sequential variable, the length variable and the position variable at respective blocks 228, 232, 236, 240 and 244. If one or more of these variables has a value specified in the command, the microprocessor 19 replaces the default value for the respective variable with the specified value. If the command does not specify a value for a given variable, the microprocessor proceeds from the respective block 228, 232, 236, 240 or 244 without replacing the default value for that variable in the scratch memory. The microprocessor also checks at blocks 230, 234, 238 and 242 for a backslash and if one is encountered, the microprocessor proceeds directly from that block to block 222.

Figure 6B:
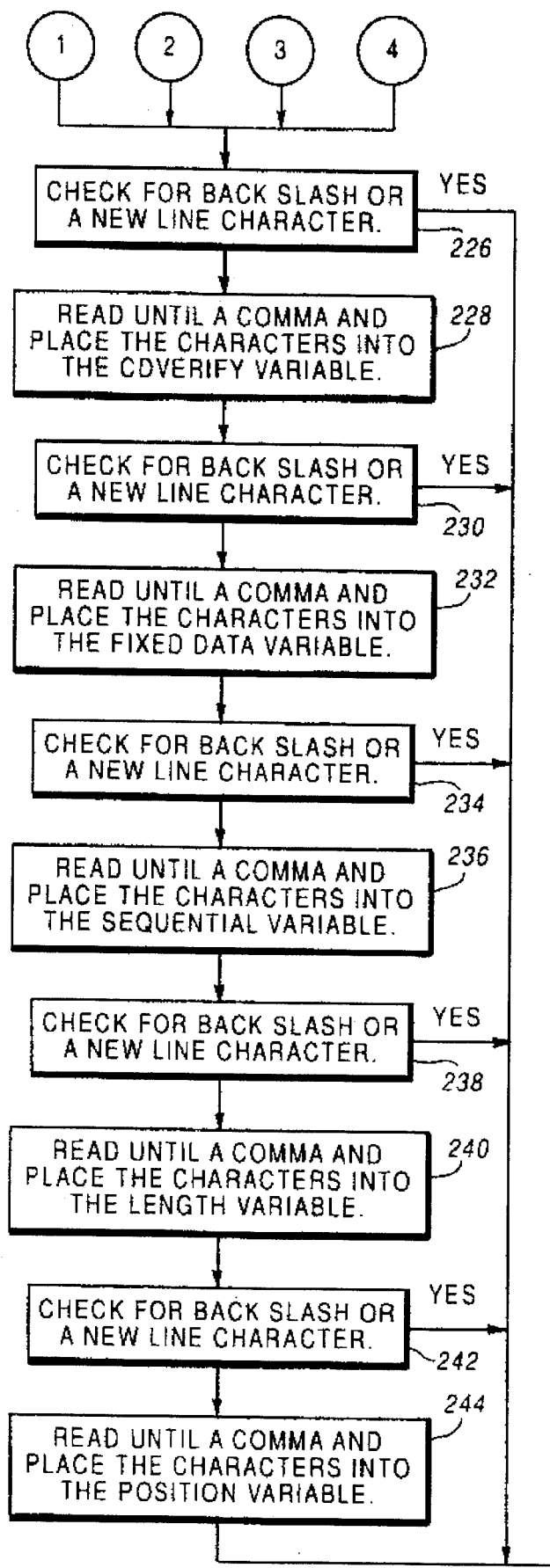
Figure 6C:
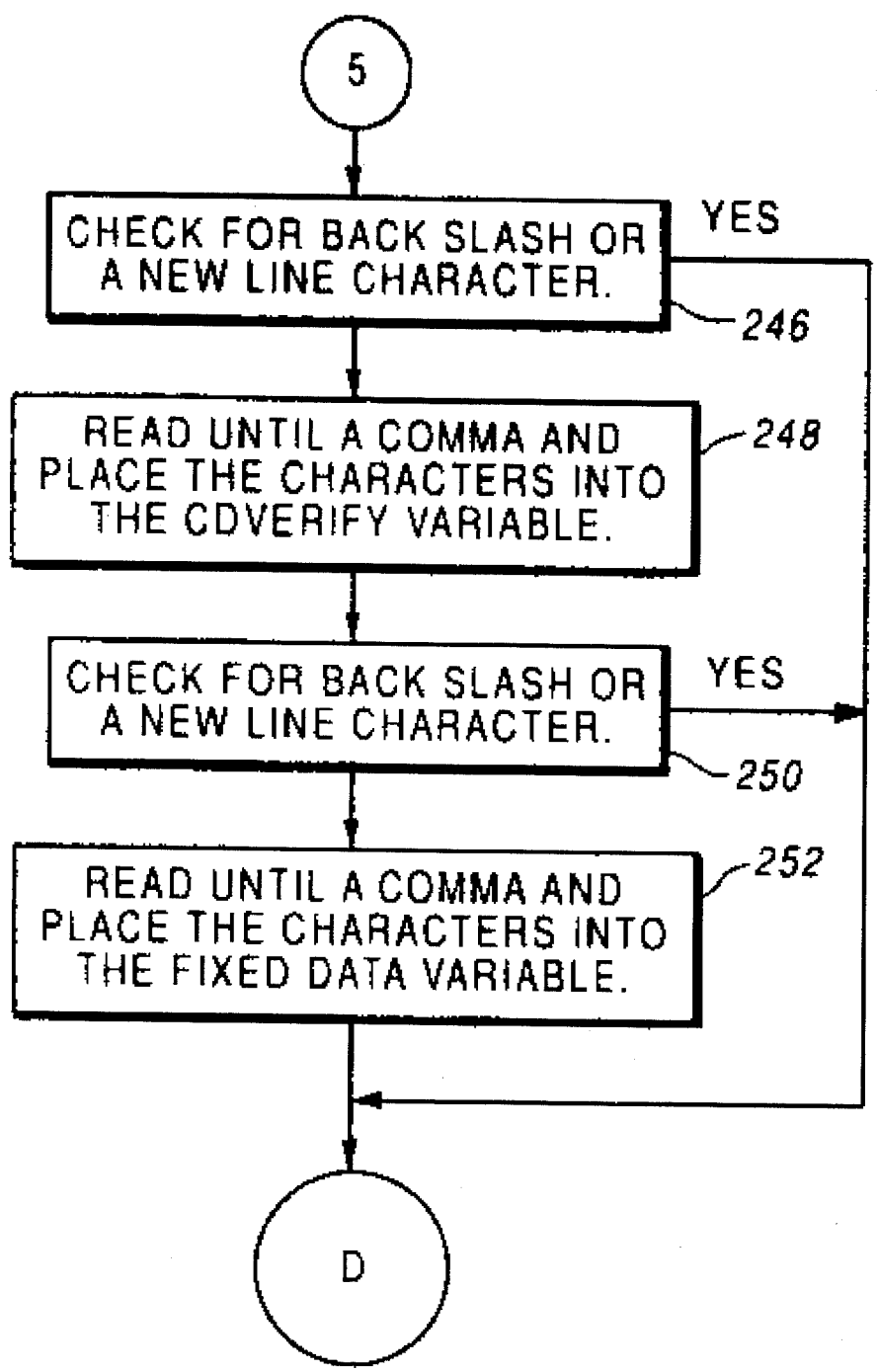

If the microprocessor determines that a barcode type 5 is specified in the multi-level user input barcode command, the microprocessor proceeds from block 220 to block 246 depicted in FIG. 6C. At block 246, the microprocessor 19 checks for a backslash and if one is encountered, the microprocessor proceeds to block 222. If a backslash is not encountered the microprocessor 19 checks to determine whether the multi-level user input barcode command specifies a value for the check digit verify variable and for the fixed data variable. If a value is specified for one or both of these variables, the microprocessor 19 at a respective block 248 and/or 252 replaces the default value for the respective variable with the specified value. If the command does not specify a value for one or both of these variables, the microprocessor proceeds from the respective block 248 or 252 without replacing the default value for that variable in the scratch pad memory. The microprocessor also checks for a backslash at block 250 and if one is encountered, the microprocessor 19 proceeds from block 250 to block 222 directly.

If the microprocessor 19 determines that the barcode type specified in the multi-level user input barcode command is a type 6 or a type 10, the microprocessor proceeds to block 254 depicted in FIG. 6D. At block 254, the microprocessor checks for a backslash and if one is present, the microprocessor proceeds to block 222. If a backslash is not present, the microprocessor 19 checks to determine whether the multi-level user input barcode command specifies a value for the minlength variable at block 256, the maxlength variable at block 260, the style variable at block 264, the check digit type variable at block 268, the check digit verify variable at block 272, the fixed data variable at block 276, the sequential variable at block 280, the length variable at block 284 and the position variable at block 288. If a value has been specified for one or more of these variables, the microprocessor 19 replaces the default value for the respective variable with the specified value at respective blocks 256, 260, 264, 268, 272, 276, 280, 284 and 288. If the command does not specify a value for one or more of these variables, the microprocessor proceeds without replacing the default value for that variable in the scratch pad memory.

If the microprocessor determines that a barcode type 7 has been specified in the multi-level user input barcode command, the microprocessor proceeds from block 220 to block 290 to check for a backslash. If a backslash is encountered, the microprocessor proceeds from block 290 to block 222. If a backslash is not encountered, however, the microprocessor 19 checks to determine whether the multi-level user input barcode command specifies a value for the minlength variable at block 292, the maxlength variable at block 296, the style variable at block 300, the fixed data variable at block 304, the sequential variable at block 308, the length variable at block 312 or the position variable at block 316. If a value is specified for one or more of these variables, the microprocessor 19 replaces the default value for the respective variable with the specified value. If the command does not specify a value for one or more of these variables, the microprocessor proceeds without replacing the default value for that variable in the scratch pad memory. The microprocessor also checks for the presence of a backslash at blocks 294, 298, 302, 306, 310 and 314. If a backslash is encountered at any one of these blocks, the microprocessor 19 proceeds from the respective block directly to block 222.

If the microprocessor determines that a barcode type 8 has been specified in the multi-level user input barcode command, the microprocessor proceeds from block 220 to block 318 depicted in FIG. 6F. At block 318 the microprocessor determines whether a backslash has been encountered and if so, proceeds directly to block 222. If a backslash is not encountered as determined at block 318, the microprocessor 19 checks to determine whether the multi-level user input barcode command specifies a value for the start character variable at block 320, the stop character variable at block 322, minlength variable at block 326, the maxlength variable at block 328, the style variable at block 332, the fixed data variable at block 336, the sequential variable at block 340, the length variable at block 344 and the position variable at block 348. If a value has been specified for one or more of these variables, the microprocessor 19 replaces the default value for the respective variable with the specified value. If the command does not specify a value for one or more of these variables, the microprocessor proceeds without replacing the default value for that variable in the scratch pad memory. The microprocessor also checks for a backslash at blocks 321, 324, 327, 330, 334, 338, 342, and 346. If a backslash is encountered at one of these blocks, the microprocessor proceeds from that block directly to block 222.

If the microprocessor determines that a barcode type 9 has been specified in the multi-level user input barcode command, the microprocessor proceeds to block 350 depicted in FIG. 6G. At block 350, the microprocessor checks to determine whether a backslash is next encountered and if so, proceeds directly to block 222. If a backslash is not encountered, the microprocessor checks to determine whether the multi-level user input barcode command specifies a value for the minlength variable at block 352, the maxlength variable at block 356, the style variable at block 360, the check digit type variable at block 364, the check digit verify variable at block 368 and the fixed data variable at block 372. If a value has been specified for one or more of these variables, the microprocessor 19 replaces the default value for the respective variable with the specified value. If the command does not specify a value for one or more of these variables, the microprocessor proceeds without replacing the default value for that variable in the scratch pad memory. At blocks 354, 258, 362, 366 and 370 the microprocessor also determines whether a backslash is encountered. If a backslash is encountered as determined at one of these blocks the microprocessor proceeds from that block directly to block 222.

Figure 7:
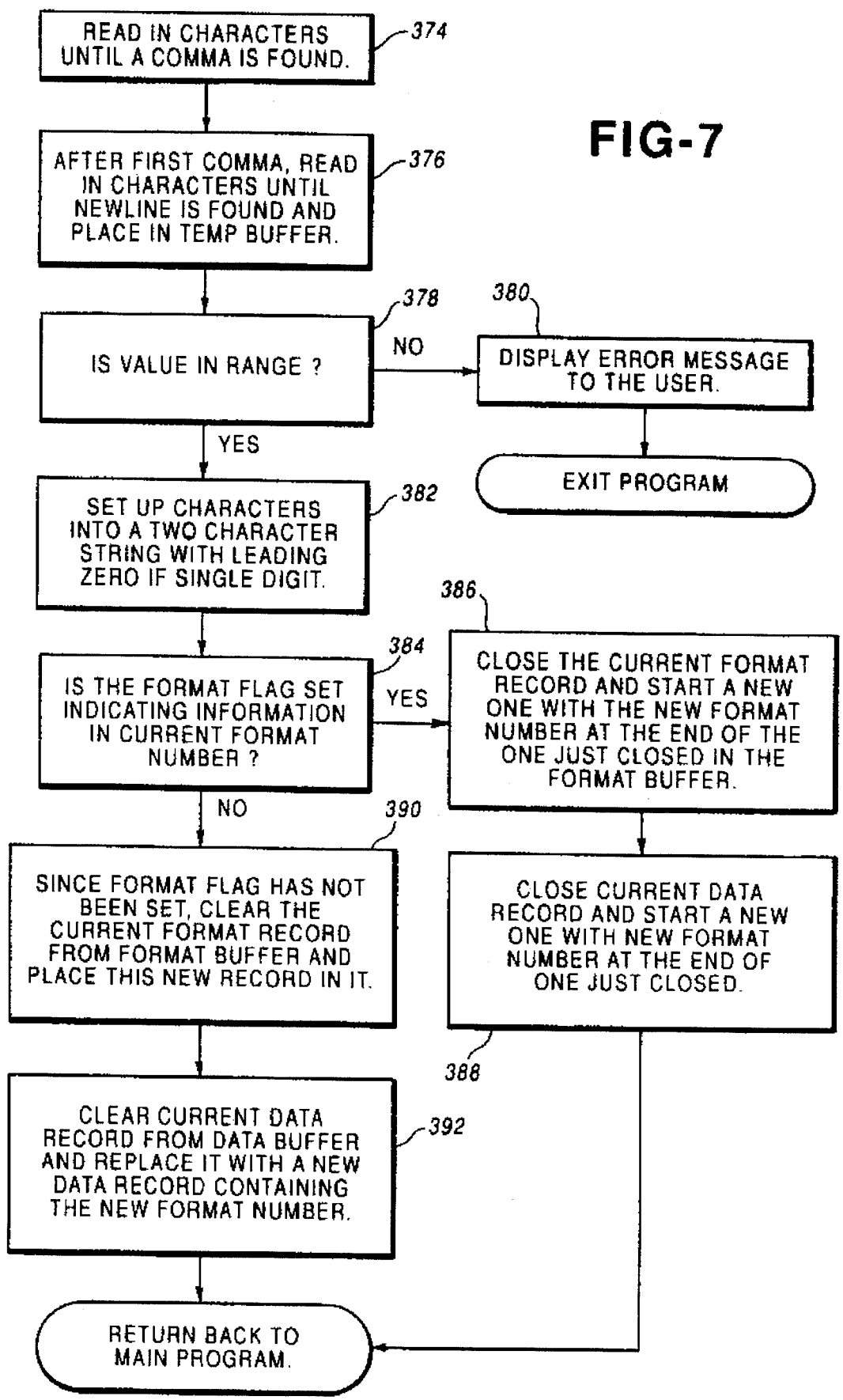
FIG. 7 is a flow chart illustrating a format command subroutine.

The format command subroutine is depicted in FIG. 7. At the start of the subroutine, the microprocessor at a block 374 reads in the characters until a comma is found. Thereafter, the microprocessor proceeds to block 376 to read in the characters following the first comma until a new line is found, the microprocessor placing the characters in a temporary buffer. Thereafter, the microprocessor proceeds to block 378 to determine whether the value represented by the read characters is within a predetermined range specified for the format command. If the value is not within the range, the microprocessor proceeds to block 380 to display an error message to the user on the display 18. If the value is within the range as determined at block 378, the microprocessor proceeds from block 378 to block 382. At block 382, the microprocessor 19 sets the read characters into a two-character string, adding a leading zero if the characters represent a single digit. Thereafter, at a block 384 the microprocessor 19 determines whether the format flag is set indicating information in the current format number. If the flag is set, the microprocessor proceeds to block 386 to close the current format record and to start a new one with the new format number at the end of the format record just closed. Thereafter the microprocessor proceeds to block 388 to close the current data record and start a new data record in association with the new format number. If the format flag is not set, the microprocessor proceeds from block 384 to block 390. At block 390, the microprocessor clears the current format record from the format buffer and places the new record in the format buffer. At block 392 the microprocessor 19 then clears the current data record from the data buffer and replaces the data record with a new data record containing the new format number. Thereafter, the microprocessor returns to the main program depicted in FIG. 2.

If the microprocessor 19 determines, when executing the main program, that the command specified is a label command, scantype command, X command, Y command, font command, font size command, style command, justify command, bar height command, appearance command, minlength command, maxlength command, check digit type command, check digit verify command, sequential command, length command, on demand command, currency command, strip command, trigger command, multiple command, supply command or end count command as discussed above, the microprocessor implements a respective subroutine that follows the general format of the subroutine depicted in FIG. 8. More particularly, the microprocessor 19 at a block 394 reads in the first set of characters identifying the command until a comma is found. At block 396, the microprocessor then reads in the characters following the first comma until a new line is found, the microprocessor storing this second group of characters in a temporary buffer in the memory 20. At block 398, the microprocessor 19 determines whether the value represented by the second read group of characters is in a given range associated with the respective command being processed. If not, the microprocessor proceeds from block 398 to block 400 to display an error message to the user on the display 18. If the value is within the range specified for the given command, the microprocessor proceeds from block 398 to a block 402 to set the read characters into a two-character string, adding a leading zero if the character represents a single digit. Thereafter, at a block 404, the microprocessor 19 changes the default value stored in the scratch pad memory for the respective command to the new value represented by the read characters, thereafter returning to the main program.

The rotation command subroutine follows the generalized subroutine depicted in FIG. 8, except after determining that the value represented by the read characters is within the allowable range for the rotation command at block 398, the microprocessor 19 converts the degrees value to a direction value that the barcode printer 11 understands, and thereafter proceeds to block 402.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A barcode printer command communication system operable on a host processing system having a user operable input device, said host processing system communicating with a barcode printer that is responsive to a printer command data stream in a predetermined printer language to print a barcode and/or alphanumeric information on a web of record members, said barcode printer command communication system comprising:

means for correlating each of a plurality of printer command functions with a plurality of multi-level user input printer commands enterable via said input device, each of said multi-level user input printer commands requiring a different level of information to be entered by a user for a given printer command function;

means responsive to said correlating means for converting an entered multi-level user input printer command into a printer command data stream in said predetermined printer language.

2. A barcode printer command communication system as recited in claim 1 wherein each printer command function has an associated low level user input printer command and a high level user input printer command, said low level user input printer command including a user readable word and said high level user input printer command including an abbreviation of said word.

3. A barcode printer command communication system as recited in claim 1 wherein each printer command function has a plurality of associated format variables defining attributes of said function, and further including means for storing default values for each of said variables to allow a user to enter for a printer command function a low level user input printer command that does not include values for each of said variables or a higher level user input printer command that does include values for at least one of said variables.

4. A barcode printer command communication system as recited in claim 1 wherein said multi-level user input printer commands associated with a given printer command function are variable in length.

5. A barcode printer command communication system as recited in claim 1 wherein one of said printer command functions includes a price command function and said multi-level user input printer commands associated with said price command function include a data portion representing a price, said host processing system including means for storing default values for format information not specified in a multi-level user input price command and said converting means converting a multi-level user input price command into a price command data stream including price data specified in the command and format information specified in the command or stored as one or more default values to control said barcode printer to print said price data on a web of record members in accordance with said format information.

6. A barcode printer command communication system as recited in claim 1 wherein one of said printer command functions includes a text command function and said multi-level user input commands associated with said text command function include a data portion representing a text, said host processing system including means for storing default values for format information not specified in a multi-level user input text command, said converting means converting a multi-level user input text printer command into a printer text command data stream including text data specified in said command and format information specified in the command or stored as one or more default values to control said barcode printer to print said text data on a web of record members in accordance with said format information.

7. A barcode printer command communication system as recited in claim 1 wherein one of said printer command functions includes a barcode command function and said multi-level user input commands associated with said barcode command function include a data portion representing a barcode, said host processing system including means for storing default values for format information not specified in a multi-level user input barcode command, said converting means converting a multi-level user input barcode command into a printer barcode command data stream including barcode data specified in said command and format information specified in the command or stored as one or more default values to control said barcode printer to print said barcode data on a web of record members in accordance with said format information.

8. A multi-level user operable barcode printing system comprising:

a barcode printer responsive to a printer command data stream received in a predetermined printer language to print a barcode and/or alphanumeric information on a web of record members; and a host processing system capable of communicating with said barcode printer and having a user operable input device, said host processing system including means for correlating each of a plurality of printer command functions with a plurality of multi-level user input printer commands enterable via said input device, each of said multi-level user input printer commands requiring a different level of information to be entered by a user for a given printer command function; and means responsive to said correlating means for converting an entered multi-level user input printer command into a printer command data stream in said predetermined printer language.

9. A multi-level user operable barcode printing system as recited in claim 8 wherein each printer command function has an associated low level user input printer command and a high level user input printer command, said low level user input printer command including a user readable word and said high level user input printer command including an abbreviation of said word.

10. A multi-level user operable barcode printing system as recited in claim 8 wherein each printer command function has a plurality of associated format variables defining attributes of said function, and further including means for storing default values for each of said variables to allow a user to enter for a printer command function a low level user input printer command that does not include values for each of said variables or a higher level user input printer command that does include values for at least one of said variables.

11. A multi-level user operable barcode printing system as recited in claim 8 wherein said multi-level user input printer commands associated with a given printer command function are variable in length.

12. A multi-level user operable barcode printing system as recited in claim 8 wherein one of said printer command functions includes a price command function and said multi-level user input printer commands associated with said price command function include a data portion representing a price, said host processing system including means for storing default values for format information not specified in a multi-level user input price command and said converting means converting a multi-level user input price command into a price command data stream including price data specified in the command and format information specified in the command or stored as one or more default values to control said barcode printer to print said price data on a web of record members in accordance with said format information.

13. A multi-level user operable barcode printing system as recited in claim 8 wherein one of said printer command functions includes a text command function and said multi-level user input commands associated with said text command function include a data portion representing a text, said host processing system including means for storing default values for format information not specified in a multi-level user input text command, said converting means converting a multi-level user input text command into a printer text command data stream including text data specified in said command and format information specified in the command or stored as one or more default values to control said barcode printer to print said text data on a web of record members in accordance with said format information.

14. A multi-level user operable barcode printing system as recited in claim 8 wherein one of said printer command functions includes a barcode command function and said multi-level user input commands associated with said barcode command function include a data portion representing a barcode, said host processing system including means for storing default values for format information not specified in a multi-level user input barcode command, said converting means converting a multi-level user input barcode command into a printer barcode command data stream including barcode data specified in said command and format information specified in the command or stored as one or more default values to control said barcode printer to print said barcode data on a web of record members in accordance with said format information.

15. A method of operating a host processing system to communicate printer command data streams in a predetermined printer language to a barcode printer to cause said printer to print a barcode and/or alphanumeric information on a web of record members, said host processing system having a user operable input device and said method comprising:

correlating each of a plurality of printer command functions with a plurality of multi-level user input printer commands enterable via said input device, each of said multi-level user input printer commands requiring a different level of information to be entered by a user for a given printer command function; and converting an entered multi-level user input printer command into a printer command data stream in said predetermined printer language for communications to said barcode printer.

16. A method as recited in claim 15 further including the step of storing default values for a plurality of format variables associated with each of said printer command functions, said converting step including the step of converting a format default value for each format variable for which a value is not specified in said multi-level user input command.

* * * * *